US008888584B2

(12) United States Patent
Cohen

(10) Patent No.: US 8,888,584 B2
(45) Date of Patent: Nov. 18, 2014

(54) GAMING SYSTEM AND METHOD PROVIDING A FANTASY SPORTS GAME

(75) Inventor: Alexander Casey Naglestad Cohen, Truckee, CA (US)

(73) Assignee: IGT, Las Vegas, NV (US)

( * ) Notice: Subject to any disclaimer, the term of this patent is extended or adjusted under 35 U.S.C. 154(b) by 472 days.

(21) Appl. No.: 13/364,641

(22) Filed: Feb. 2, 2012

(65) Prior Publication Data

US 2012/0202599 A1 Aug. 9, 2012

Related U.S. Application Data

(60) Provisional application No. 61/462,462, filed on Feb. 3, 2011.

(51) Int. Cl.
*A63F 13/12* (2006.01)
*A63F 13/30* (2014.01)

(52) U.S. Cl.
CPC ......... *A63F 13/12* (2013.01); *A63F 2300/5593* (2013.01); *A63F 2300/61* (2013.01); *A63F 2300/5533* (2013.01); *A63F 2300/5566* (2013.01); *A63F 2300/8052* (2013.01)
USPC .............................................. 463/25; 700/91

(58) Field of Classification Search
CPC ............ A63F 13/12; A63F 2300/8052; A63F 2300/556; A63F 2300/5546; A63F 2300/5593; A63F 2300/61; A63F 2300/5533; A63F 2300/5566; G07F 17/3272; G07F 17/3274; G07F 17/3276; G07F 17/3244; G07F 17/3225; G07F 17/323; G07F 17/3262
USPC ................. 463/25, 26–28, 40–42; 700/91–93
See application file for complete search history.

(56) References Cited

U.S. PATENT DOCUMENTS

| 4,373,723 | A | | 2/1983 | Brown et al. | |
|---|---|---|---|---|---|
| 4,918,603 | A | * | 4/1990 | Hughes et al. | ................... 463/4 |
| 5,795,226 | A | | 8/1998 | Yi | |
| 5,830,068 | A | | 11/1998 | Brenner et al. | |

(Continued)

OTHER PUBLICATIONS

Snider, Mike, "Latest play for 'Madden NFL': Facebook," USA Today, available at http://content.usatoday.com/communities/gamehunters/post/2010/08/latest-play-for-madden-nfl-facebook/1, Aug. 31, 2010 (4 pages).

(Continued)

*Primary Examiner* — David L Lewis
*Assistant Examiner* — Matthew D Hoel
(74) *Attorney, Agent, or Firm* — Neal, Gerber & Eisenberg LLP

(57) ABSTRACT

The present disclosure provides a gaming system and method providing a fantasy sports game. The gaming system enables a player to create a fantasy sports team associated with a sports league, select one or more athletes who play or have played in that sports league to include on the player's team, and enter the player's team into a competition against other teams. For each of the teams, for each of the athletes on that team, the gaming system determines a simulated performance of that athlete based on designated historical performance data and determines an athlete score of that athlete based on the simulated performance. The gaming system determines a total team score for each team. The gaming system determines which of the teams has the highest total team score, identifies that team as the winner, and provides one or more awards to the winning team.

20 Claims, 18 Drawing Sheets

(56) References Cited

U.S. PATENT DOCUMENTS

| | | | |
|---|---|---|---|
| 5,888,136 A | 3/1999 | Herbert | |
| 5,957,775 A | 9/1999 | Cherry | |
| 6,292,706 B1 | 9/2001 | Birch et al. | |
| 6,358,150 B1 | 3/2002 | Mir et al. | |
| 6,371,855 B1* | 4/2002 | Gavriloff | 463/42 |
| 6,406,369 B1 | 6/2002 | Baerlocher et al. | |
| 6,425,824 B1 | 7/2002 | Baerlocher et al. | |
| 6,780,110 B2 | 8/2004 | Baerlocher et al. | |
| 6,837,793 B2 | 1/2005 | McClintic | |
| 6,840,856 B2 | 1/2005 | Stern | |
| 6,902,478 B2 | 6/2005 | McClintic | |
| 6,910,965 B2* | 6/2005 | Downes | 463/28 |
| 6,939,224 B2 | 9/2005 | Palmer et al. | |
| 7,037,192 B2 | 5/2006 | Baerlocher et al. | |
| 7,077,744 B2 | 7/2006 | Cannon | |
| 7,201,657 B2 | 4/2007 | Baerlocher et al. | |
| 7,314,408 B2 | 1/2008 | Cannon | |
| 7,314,410 B2 | 1/2008 | Baerlocher et al. | |
| 7,351,150 B2 | 4/2008 | Sanchez | |
| 7,357,714 B2 | 4/2008 | Tessmer et al. | |
| 7,361,087 B2 | 4/2008 | Baerlocher et al. | |
| 7,548,242 B1 | 6/2009 | Hughes et al. | |
| 7,594,850 B2 | 9/2009 | Baerlocher et al. | |
| 7,614,944 B1* | 11/2009 | Hughes et al. | 463/4 |
| 7,666,094 B2 | 2/2010 | Baerlocher et al. | |
| 7,674,178 B2 | 3/2010 | Baerlocher et al. | |
| 7,674,179 B2 | 3/2010 | Baerlocher et al. | |
| 7,677,971 B2 | 3/2010 | Baerlocher et al. | |
| 7,677,972 B2 | 3/2010 | Baerlocher et al. | |
| 7,682,248 B2 | 3/2010 | Baerlocher et al. | |
| 7,699,707 B2 | 4/2010 | Bahou | |
| 7,762,878 B2 | 7/2010 | Nicholas et al. | |
| 7,785,186 B2 | 8/2010 | Tessmer et al. | |
| 7,791,607 B1 | 9/2010 | Hughes et al. | |
| 7,803,044 B2 | 9/2010 | Baerlocher et al. | |
| 7,827,202 B2 | 11/2010 | Relyea et al. | |
| 7,883,403 B2 | 2/2011 | Low et al. | |
| 7,914,372 B2 | 3/2011 | Tessmer et al. | |
| 7,922,570 B2 | 4/2011 | Del Prado | |
| 7,988,560 B1 | 8/2011 | Heller et al. | |
| 8,052,521 B2 | 11/2011 | Webb et al. | |
| 8,099,182 B1 | 1/2012 | Kasten | |
| 8,105,166 B2 | 1/2012 | Cayce et al. | |
| 2001/0014619 A1 | 8/2001 | Kusuda | |
| 2002/0058548 A1 | 5/2002 | Stronach | |
| 2002/0107590 A1 | 8/2002 | Liegey | |
| 2003/0087683 A1 | 5/2003 | Gatto et al. | |
| 2003/0125103 A1 | 7/2003 | Tessmer et al. | |
| 2004/0266530 A1 | 12/2004 | Bishop | |
| 2005/0116422 A1 | 6/2005 | Fish | |
| 2006/0046807 A1 | 3/2006 | Sanchez | |
| 2006/0183548 A1 | 8/2006 | Morris et al. | |
| 2006/0252476 A1* | 11/2006 | Bahou | 463/4 |
| 2007/0013129 A1 | 1/2007 | Laporte | |
| 2007/0013130 A1 | 1/2007 | Laporte | |
| 2007/0021167 A1* | 1/2007 | Ma et al. | 463/4 |
| 2007/0021214 A1 | 1/2007 | Ma et al. | |
| 2007/0021853 A1 | 1/2007 | Ma et al. | |
| 2007/0113250 A1 | 5/2007 | Logan et al. | |
| 2008/0032764 A1 | 2/2008 | Cannon | |
| 2008/0051201 A1 | 2/2008 | Lore | |
| 2008/0081700 A1 | 4/2008 | Biniak et al. | |
| 2008/0161113 A1 | 7/2008 | Hansen et al. | |
| 2008/0268951 A1 | 10/2008 | Gropp et al. | |
| 2008/0281444 A1 | 11/2008 | Krieger et al. | |
| 2008/0311980 A1 | 12/2008 | Cannon | |
| 2009/0181738 A1 | 7/2009 | Costin et al. | |
| 2009/0203447 A2 | 8/2009 | Hansen et al. | |
| 2009/0325685 A1 | 12/2009 | Webb et al. | |
| 2010/0197374 A1 | 8/2010 | Koivisto | |
| 2010/0203935 A1 | 8/2010 | Levy et al. | |
| 2010/0279754 A1 | 11/2010 | Tanenbaum | |
| 2010/0285857 A1 | 11/2010 | Anderson et al. | |
| 2010/0304825 A1 | 12/2010 | Davis et al. | |
| 2010/0311484 A1 | 12/2010 | Suh et al. | |
| 2011/0021262 A1 | 1/2011 | Wikander | |
| 2011/0028195 A1 | 2/2011 | Pennington et al. | |
| 2011/0028221 A1 | 2/2011 | Relyea et al. | |
| 2011/0034225 A1 | 2/2011 | Butz, Jr. et al. | |
| 2011/0092274 A1 | 4/2011 | Low et al. | |
| 2011/0111841 A1 | 5/2011 | Tessmer et al. | |
| 2011/0117981 A1 | 5/2011 | Baerlocher et al. | |
| 2011/0165946 A1 | 7/2011 | Pavlich et al. | |
| 2011/0183731 A1 | 7/2011 | Barry | |
| 2011/0183734 A1 | 7/2011 | Koivisto et al. | |
| 2011/0207523 A1 | 8/2011 | Filipour et al. | |
| 2011/0313793 A1 | 12/2011 | Lagiglia et al. | |

OTHER PUBLICATIONS

Cardwell-Winters, Kellie, "Madden NFL Superstars Walkthrough," Gamezebo, available at http://www.gamezebo.com/games/madden-nfl-superstars/walkthrough, Sep. 7, 2010 (9 pages).

"Real Madrid Fantasy Manager," Social Games List, available at http://www.social-games-list.com/real-madrid-fantasy-manager/, Jul. 24, 2011 (5 pages).

"Real Madrid Fantasy Manager 2011 Launched on Facebook," Football Marketing, available at http://www.football-marketing.com/2010/10/26/real-madrid-fantasy-manager-2011-launched-on-facebook/, Oct. 26, 2010 (8 pages).

"Scoresheet Fantasy Baseball Leagues," Scoresheet Fantasy Sports, available at http://www.scoresheet.com/BB_index.php, accessed Feb. 1, 2012 (5 pages).

"Sportsims Features," Sportsims, available at http://www.sportsims.net/features/features-3, accessed Feb. 1, 2012 (2 pages).

"Sportsims Feed. The. Fever.," Sportsims, available at http://www.sportsims.net/default.aspx, accessed Feb. 1, 2012 (1 page).

Osborne, Joe, "UFC Undisputed Fight Nation on Facebook: A Loss by Decision," games.com, available at http://blog.games.com/2011/02/07/ufc-undisputed-fight-nation/, Feb. 7, 2011 (5 pages).

Berthelson, Talor, "UFC Undisputed Fight Nation Review," Gamezebo, available at http://www.gamezebo.com/games/ufc-undisputed-fight-nation/review, Feb. 17, 2011 (4 pages).

"YesterYear Fantasy's New Simulated Fantasy Football Game," Fantasy Ethos, available at http://fantasyethos.com/2010/02/yesteryear-fantasys-new-simulated-fantasy-football-game/, Feb. 15, 2010 (8 pages).

* cited by examiner

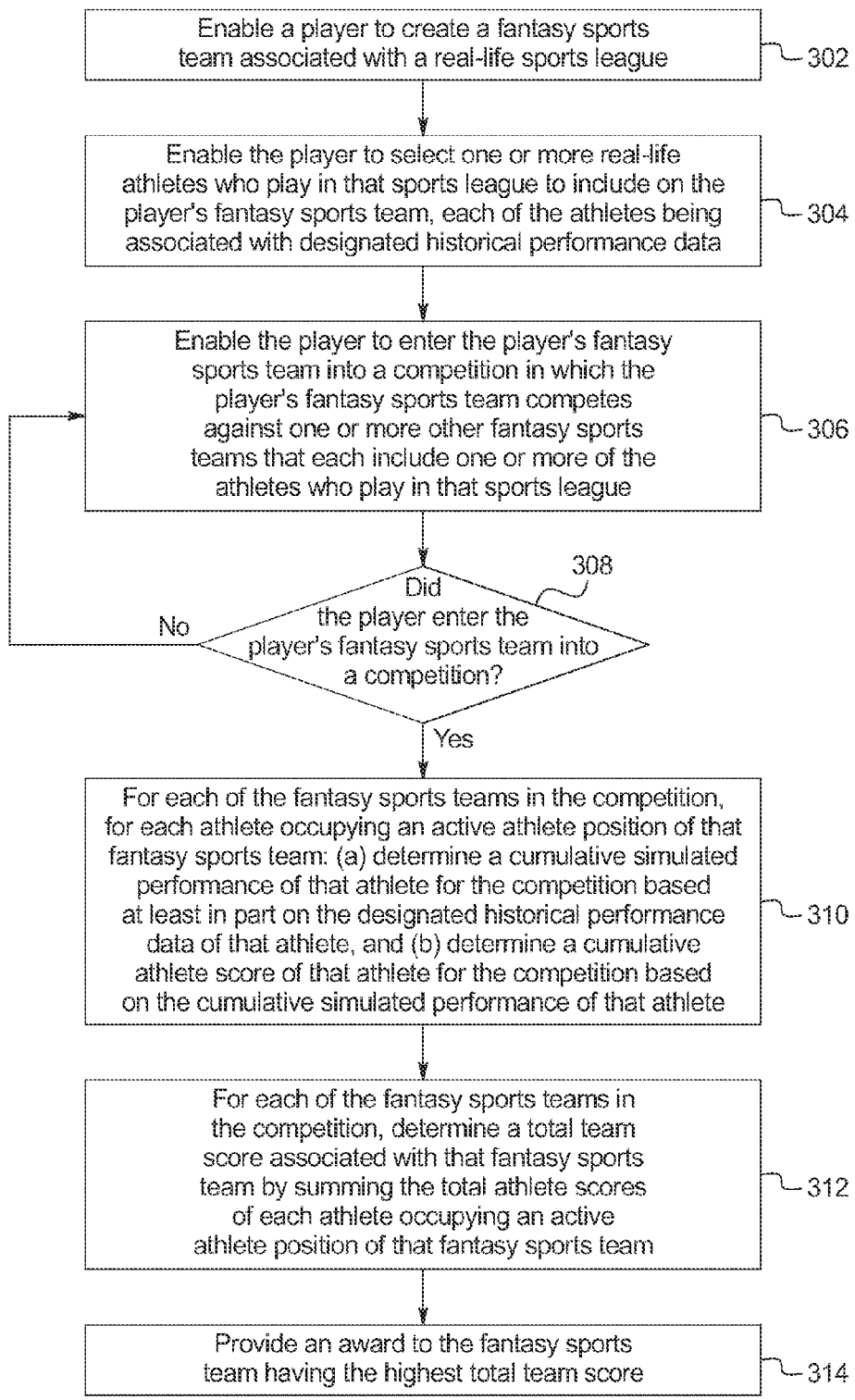

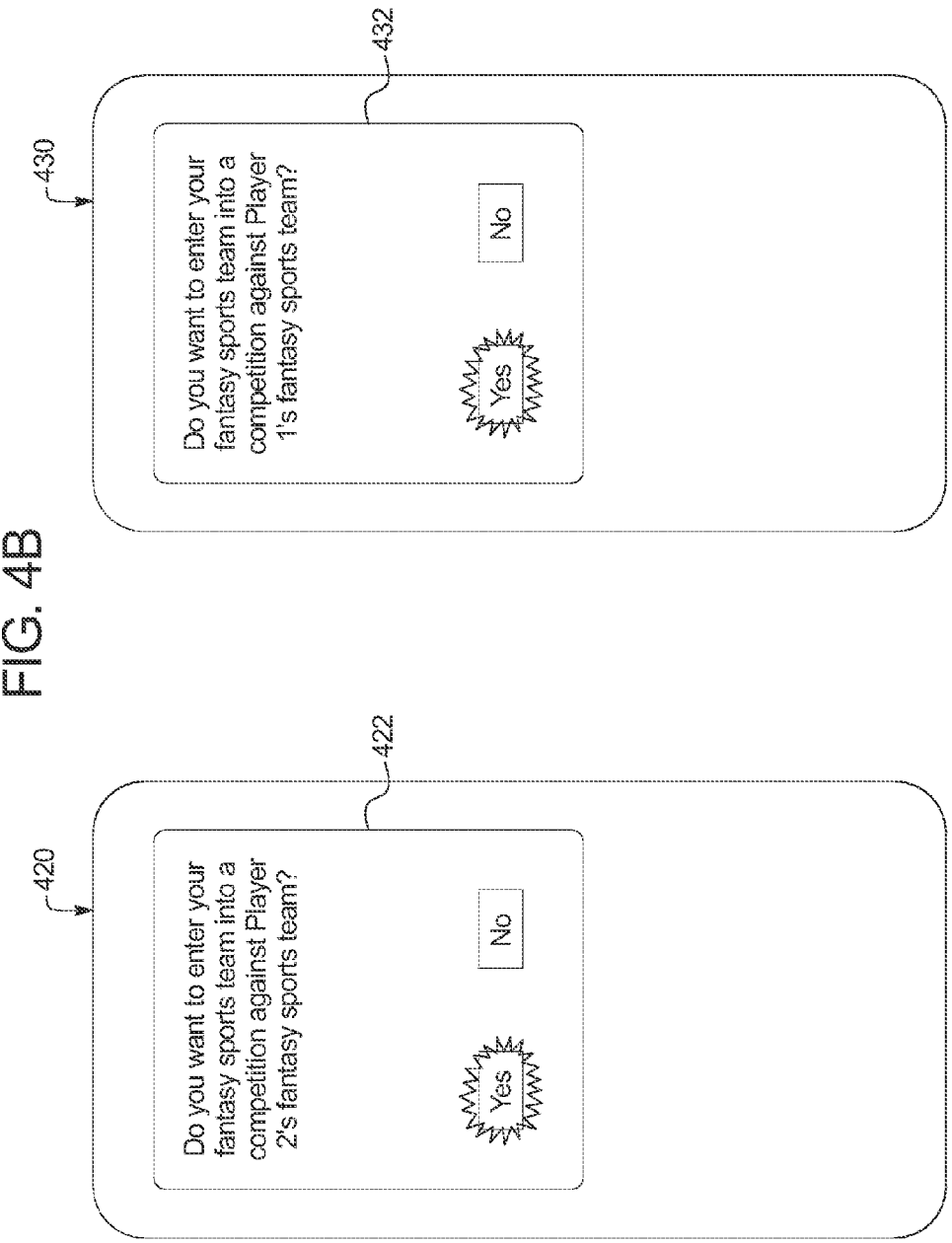

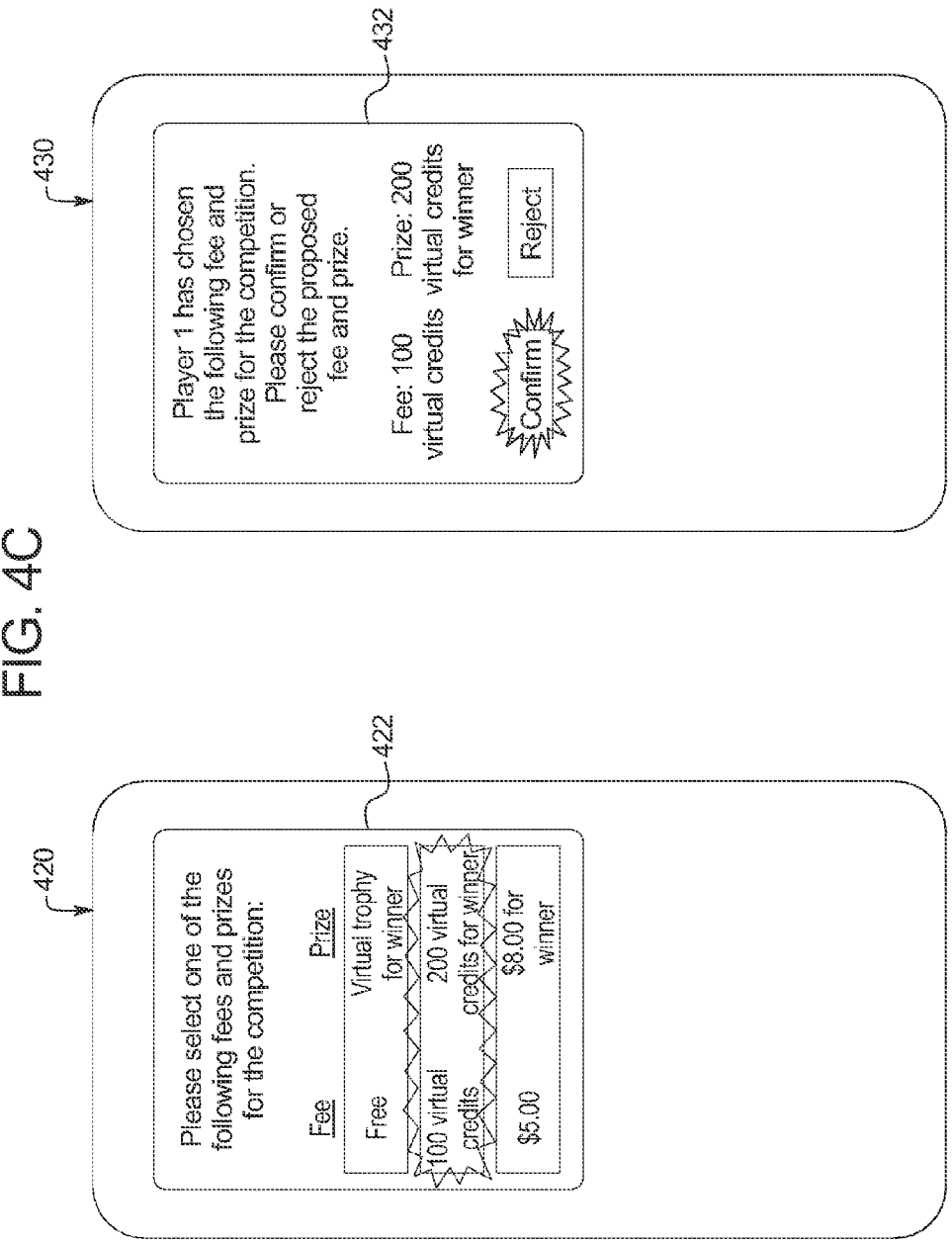

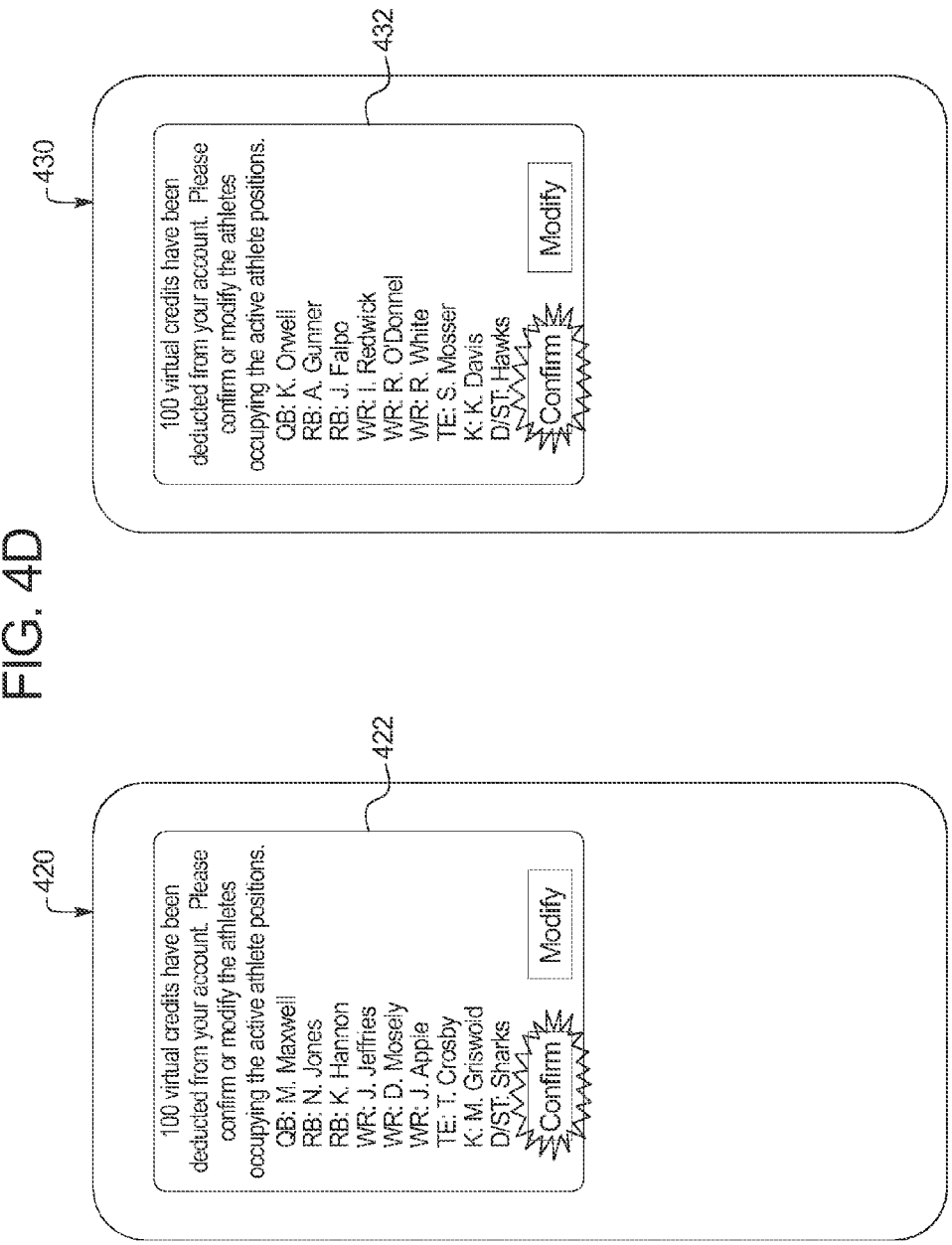

Total Athlete Scores

QB: M. Maxwell -- 28 Points
RB: N. Jones -- 3 Points
RB: K. Hannon -- 34 Points
WR: J. Jeffries -- 12 Points
WR: D. Mosely -- 8 Points
WR: J. Apple -- 0 Points
TE: T. Crosby -- 18 Points
K: M. Griswold -- 14 Points
D/ST: Sharks -- 6 Points

422

430

Total Athlete Scores

QB: K. Orwell -- 34 Points
RB: A. Gunner -- 44 Points
RB: J. Falpo -- 2 Points
WR: I. Redwick -- 4 Points
WR: R. O'Donnel -- 8 Points
WR: R. White -- 12 Points
TE: S. Mosser -- 11 Points
K: K. Davis -- 6 Points
D/ST: Hawks -- 3 Points

432

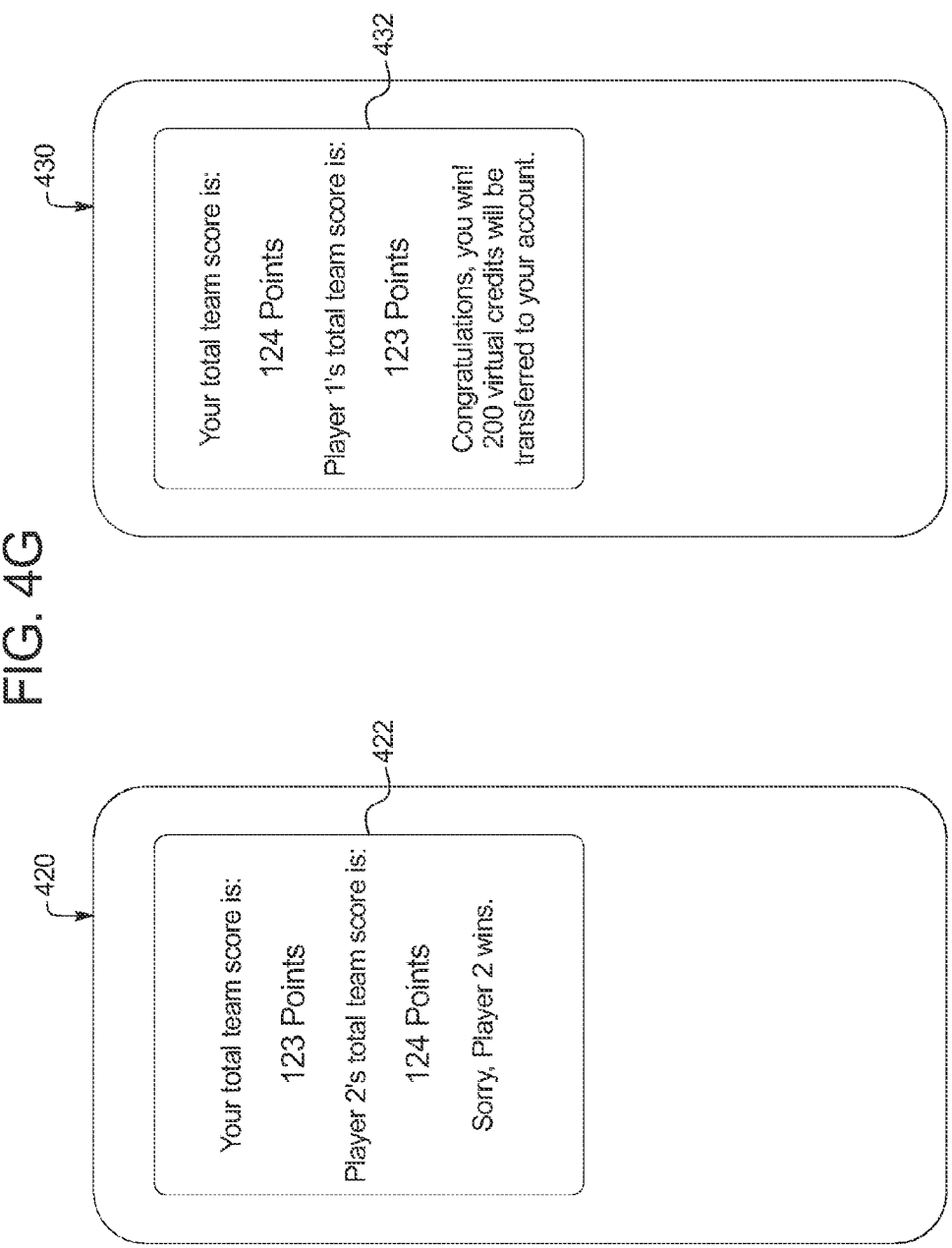

FIG. 5

| SELECT A QB | |
|---|---|
| Jim James | (Click here to add) |
| Rob Roberts | (Click here to add) |

| SELECT A RUNNING BACK | |
|---|---|
| Tony Antonio and Peter Peterson | (Click here to add) |
| Ron Ronalds and Chuck Charles | (Click here to add) |

| SELECT A KICKER | |
|---|---|
| Matt Matthews | (Click here to add) |
| David Davis | (Click here to add) |

| SELECT A DEFENSIVE TEAM | |
|---|---|
| Springfield Springers | (Click here to add) |
| Kalamazoo Kangaroos | (Click here to add) |

| My Starting Team | |
|---|---|
| QB | (Select at left) |
| RB | (Select a pair at left) |
| WR | Kevin Kevinson and Dick Dickson |
| Kicker | (Select at left) |
| Defense | (Select at left) |

| My Alternates | |
|---|---|
| QB | (Select at left) |
| RB | (Select a pair at left) |
| WR | John Johnson and Don Donalds |
| Kicker | (Select at left) |
| Defense | (Select at left) |

FIG. 6

My Starting Team — 610

| Position | Athlete | Points |
|---|---|---|
| QB | Jim James | 5 |
| RB | Tony Antonio | 10 |
| | Peter Peterson | 24 |
| WR | Kevin Kevinson | 10 |
| | Dick Dickson | 11 |
| Kicker | David Davis | 8 |
| Defense | Springfield Springers | 2 |
| | Total | 70 |

My Alternates — 620

| Position | Athlete | Sub in? |
|---|---|---|
| QB | Rob Roberts | (Click to sub in) |
| RB | Ron Ronalds and Chuck Charles | (Click to sub in) |
| WR | John Johnson and Don Donalds | (Click to sub in) |
| Kicker | Matt Matthews | (Click to sub in) |
| Defense | Kalamazoo Kangaroos | (Click to sub in) |

My Opponent's Starting Team — 630

| Position | Athlete | Points |
|---|---|---|
| QB | Rob Roberts | 10 |
| RB | Tony Antonio | 10 |
| | Peter Peterson | 24 |
| WR | Kevin Kevinson | 10 |
| | Dick Dickson | 11 |
| Kicker | David Davis | 8 |
| Defense | Springfield Springers | 2 |
| | Total | 75 |

Event Playback — 640

Jim James throws a TD --- +5 points
Peter Peterson catches a 40 yard pass --- +12*2 = 24 points
David Davis kicks a field goal --- +8 points
Dick Dickson catches a 4 yard pass

605

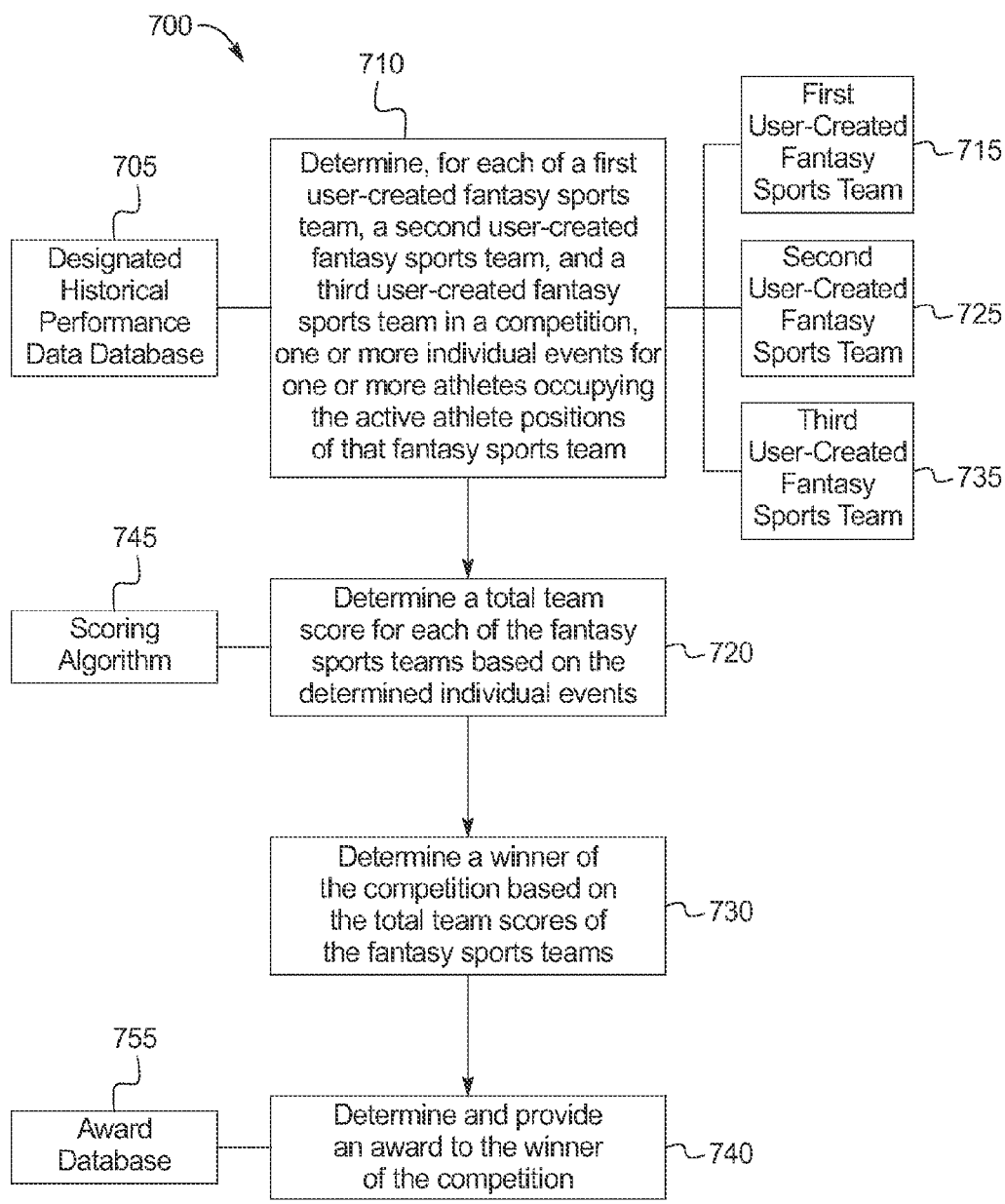

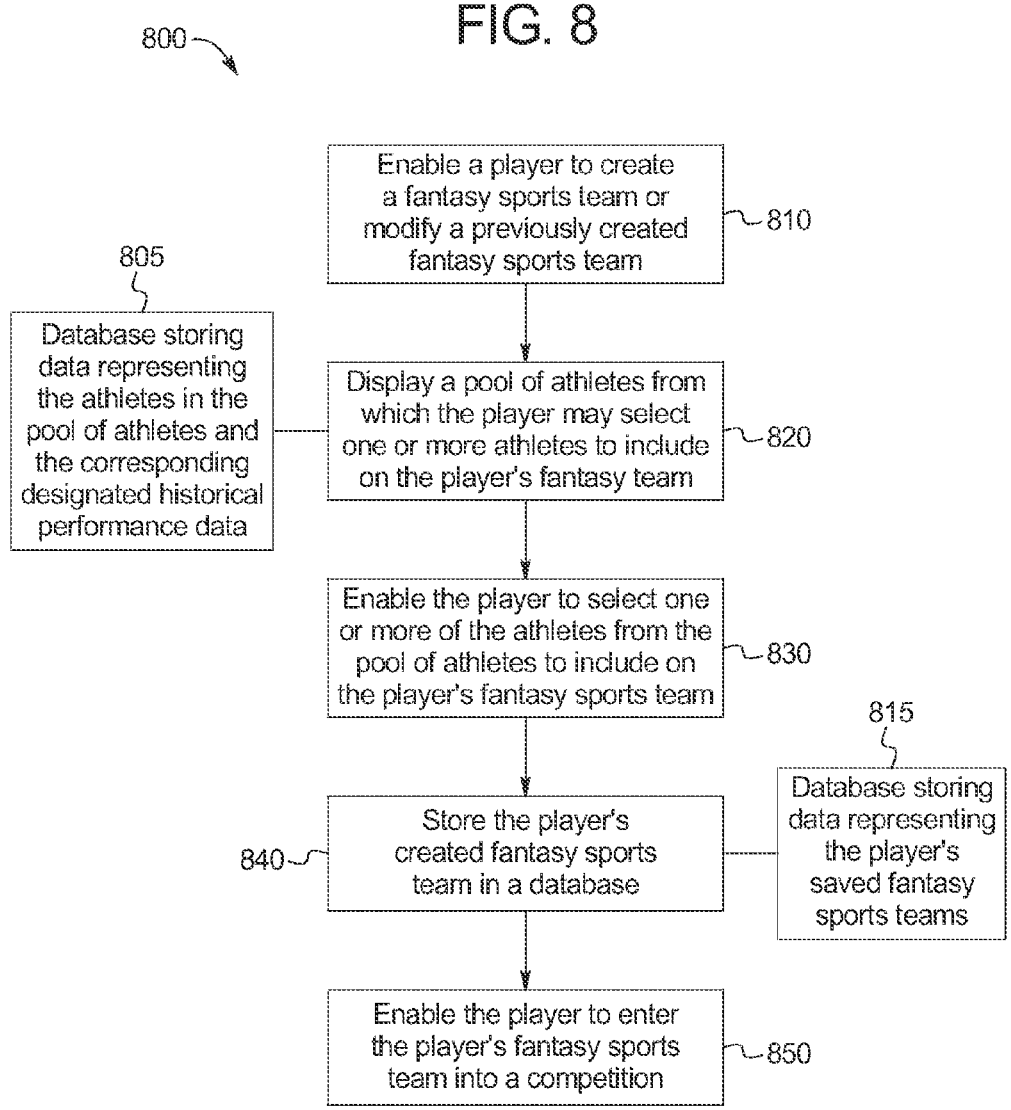

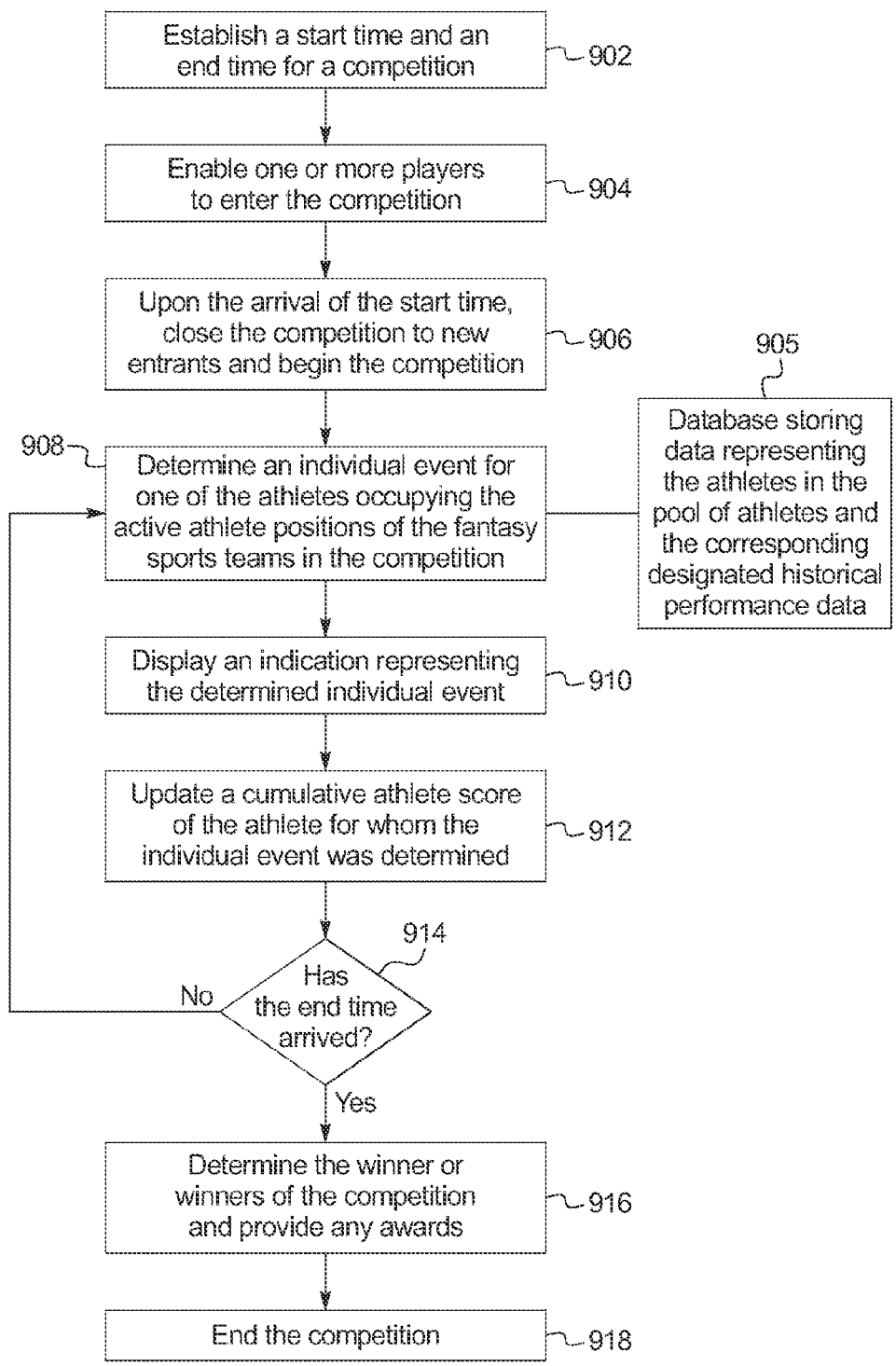

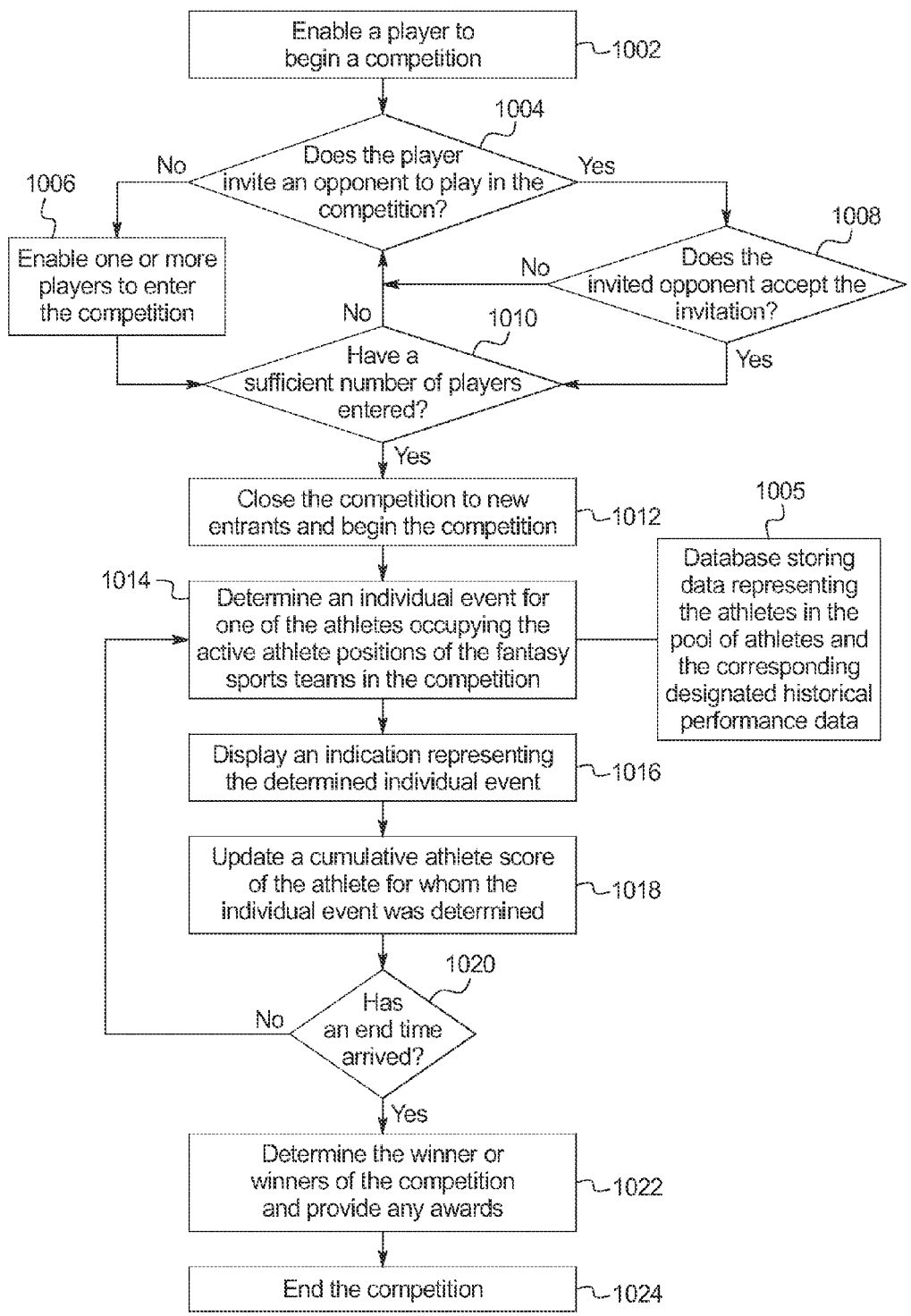

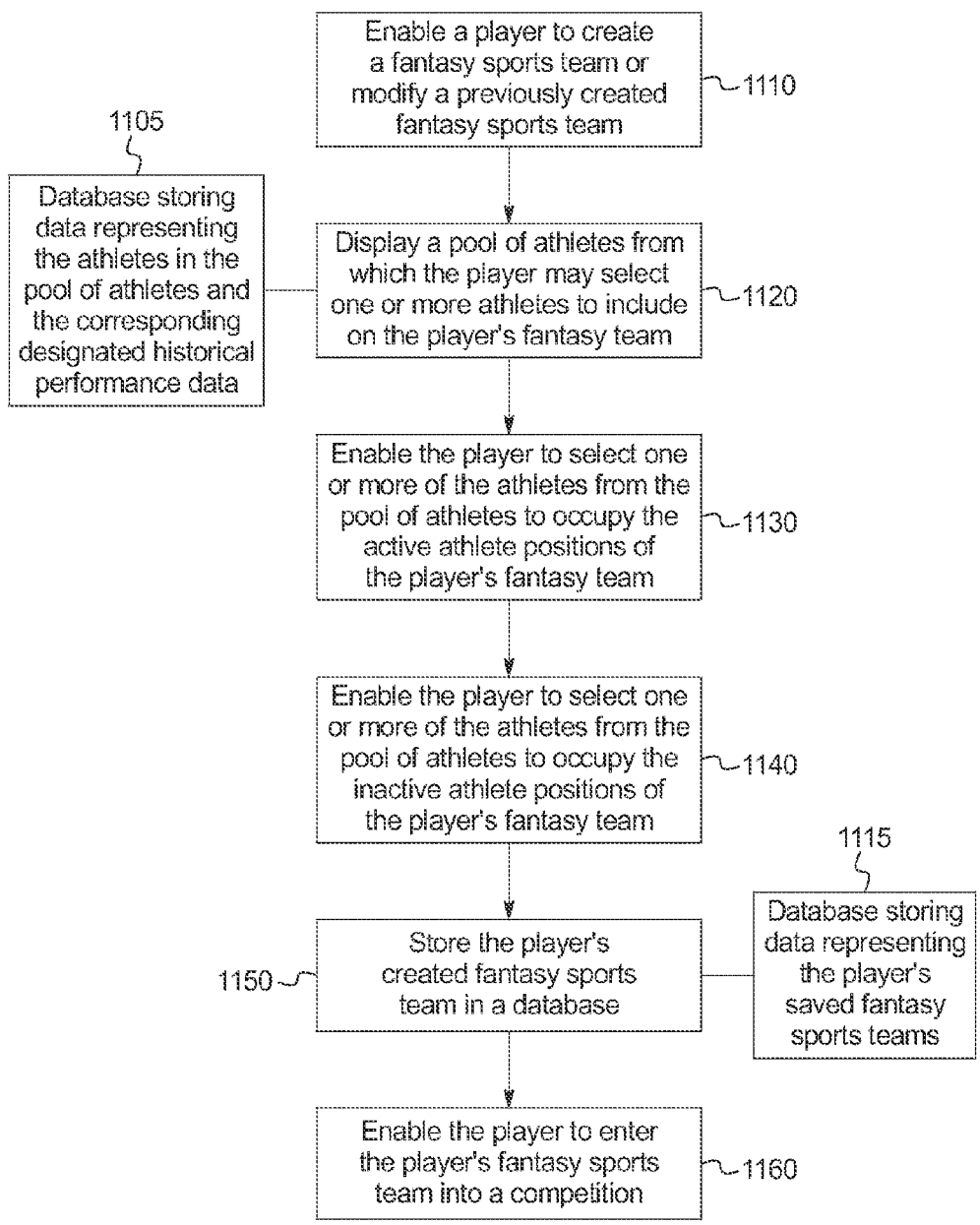

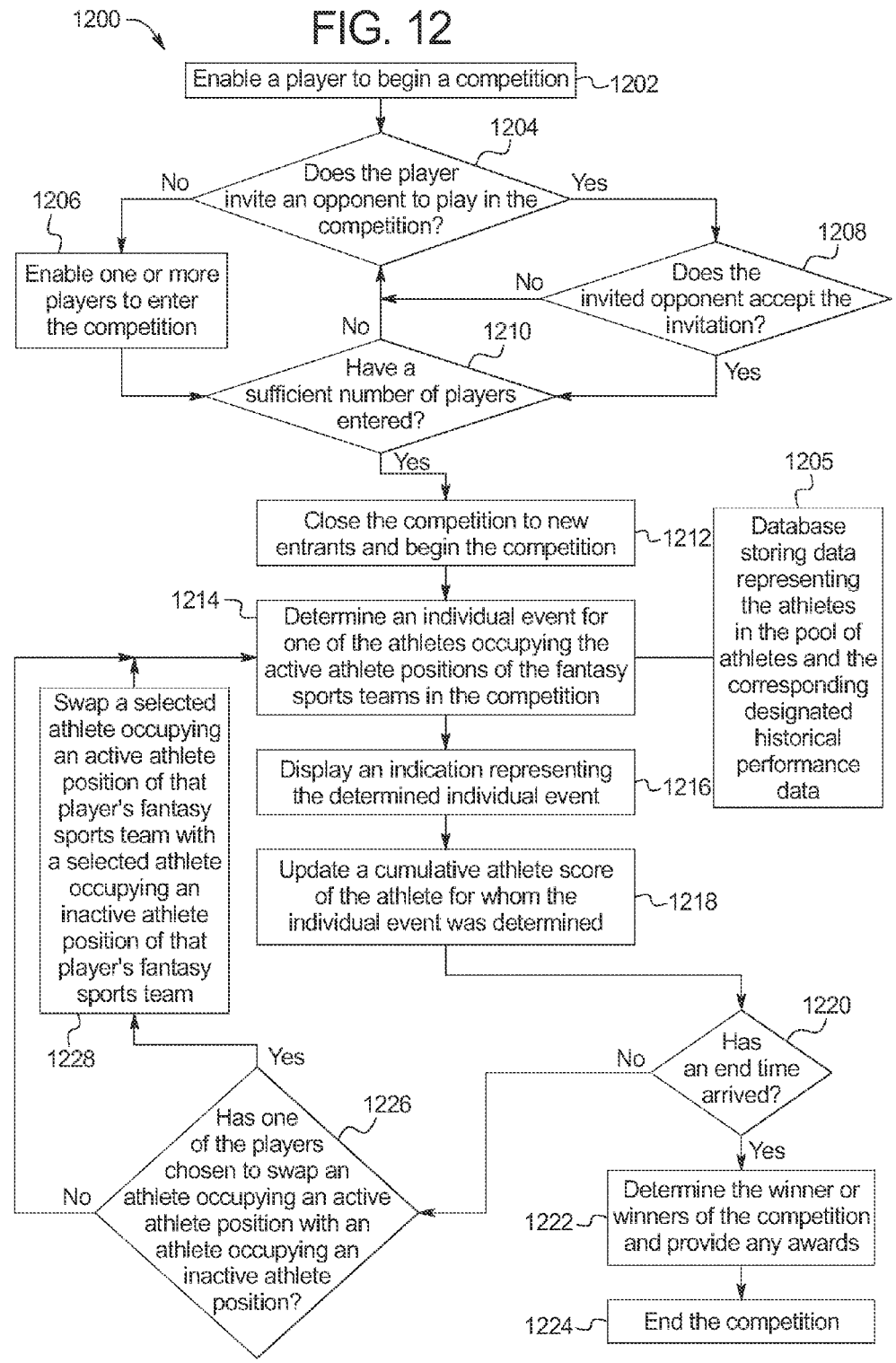

US 8,888,584 B2

GAMING SYSTEM AND METHOD PROVIDING A FANTASY SPORTS GAME

PRIORITY CLAIM

This application is a non-provisional of, and claims priority to and the benefit of, U.S. Provisional Patent Application No. 61/462,462, filed on Feb. 3, 2011, the entire contents of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Fantasy sports leagues corresponding to real-life sports leagues, such as fantasy football leagues corresponding to the National Football League (NFL) and fantasy baseball leagues corresponding to Major League Baseball (MLB), are extremely popular among sports enthusiasts. A typical fantasy sports league is operated concurrently with and associated with an entire season of or a portion of an entire season of the sports league with which the fantasy sports league is associated. For example, one known fantasy football league begins contemporaneously with the first week of the NFL regular season and ends upon completion of the last week of the NFL regular season. A typical fantasy sports league includes several teams, each of which is managed by a different player. Each of the teams includes several athletes who play in the sports league with which the fantasy sports league is associated. For example, teams in fantasy football leagues include athletes who play in the NFL.

Players of a typical fantasy sports league receive scores for their fantasy sports teams based solely on the real-life performance of the athletes on the players' teams during the season or the portion of the season of the sports league with which the fantasy sports league is associated. While the calculation of the scores varies among different types of fantasy sports leagues, in general the score for an athlete on a fantasy sports team is a linear function of various performance characteristics or statistics of that athlete in each game during the season of the sports league in which the athlete plays. In a typical fantasy sports league, a prize or an award is provided to the fantasy sports teams having the highest score during the season.

In certain other known fantasy sports leagues, teams including one or more real-life athletes compete against one another in simulated games. For example, in one such fantasy football league, one team competes against another team in a simulated football game wherein events that occur during the football game are simulated and the outcome of the football game is simulated. In these known fantasy sports leagues, such simulations are typically performed based on the historical performance of one or more of the athletes on the teams.

Certain known video games are also configured to simulate the outcome of a sporting event. Such known video games typically simulate the outcome of the sporting event by simulating events within the sporting event using a probability distribution derived from historical performance of real-life athletes. More specifically, such known video games simulate the events within the sporting event using a probability distribution derived from historical performance of real-life athletes who are represented in the sporting event.

There is a continuing need to provide new and exciting fantasy sports games employing simulated outcomes based on athletes' historical performances to eliminate the dependence of typical fantasy sports leagues on the schedules of sports leagues with which they are associated while still providing players an entertaining, realistic experience.

SUMMARY

Various embodiments of the present disclosure provide a gaming system and method providing a fantasy sports game. In general, the gaming system is configured to enable a player to create a fantasy sports team associated with a real-life sports league. The gaming system enables the player to select one or more real-life athletes who play or have played in that sports league to include on the player's fantasy sports team. The gaming system enables the player to enter the player's fantasy sports team into a competition in which the player's fantasy sports team competes against one or more other fantasy sports teams that each include one or more of the athletes who play or have played in that sports league. For each of the fantasy sports teams in the competition, for one or more of the athletes on that fantasy sports team, the gaming system: (a) determines a cumulative simulated performance of that athlete for the competition based at least in part on designated historical performance data of that athlete over a designated period, and (b) determines a cumulative athlete score of that athlete for the competition based on the cumulative simulated performance of that athlete. For each of the fantasy sports teams in the competition, the gaming system determines a total team score associated with that fantasy sports team by summing the cumulative athlete scores of one or more of the athletes on that fantasy sports team. The gaming system determines which of the fantasy sports teams in the competition has the highest total team score, and identifies that fantasy sports team as the winner of the competition.

Additional features and advantages are described herein, and will be apparent from, the following Detailed Description and the Figures.

BRIEF DESCRIPTION OF THE FIGURES

FIG. 3 is a flowchart illustrating an example method of operating a gaming system of one embodiment of the present disclosure.

FIGS. 4B, 4C, 4D, 4E, 4F, and 4G are front views of the user devices of FIG. 4A, and illustrate an example on-demand competition between fantasy sports teams of two players.

FIG. 5 illustrates a front view of a display device of an example user device of the present disclosure displaying an active athlete position selection screen that enables a player to select which of the athletes on the player's fantasy sports team to assign to the active athlete positions of the player's fantasy sports team.

FIG. 6 illustrates a front view of a display device of another example user device of the present disclosure displaying a competition screen for a first player who has entered a fantasy sports team into a competition against a fantasy sports team of a second player.

FIG. 7 is a flowchart illustrating an example of a method for determining individual competition events for one or more athletes occupying one or more active athlete positions of one or more fantasy sports teams in a competition.

FIG. 8 is a flowchart illustrating an example of a method for enabling a player to create a fantasy sports team and select athletes to include on the player's fantasy sports team.

FIG. 9 is a flowchart illustrating an example of a method for operating a competition that begins at a first predetermined time and ends at a second subsequent predetermined time.

FIG. 10 is a flowchart illustrating an example of a method for enabling a player to create an on-demand competition and invite opponents to join the player in the on-demand competition, and for operating the on-demand competition.

FIG. 11 is a flowchart illustrating an example of a method for enabling a player to create a fantasy sports team and select athletes to occupy the active and inactive athlete positions on the player's fantasy sports team.

FIG. 12 is a flowchart illustrating an example of a method for enabling a player to create an on-demand competition and invite opponents to join the player in the on-demand competition, for operating the on-demand competition, and for enabling a player to swap an athlete occupying an active athlete position of that player's fantasy sports team with an athlete occupying an inactive athlete position of that player's fantasy sports team.

DETAILED DESCRIPTION

Gaming Systems

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; and/or (b) one or more user devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more user devices in combination with one or more central servers, central controllers, or remote hosts; (b) a single user device; (c) a plurality of user devices in combination with one another; (d) a single central server, central controller, or remote host; and/or (e) a plurality of central servers, central controllers, or remote hosts in combination with one another.

Figure 1:
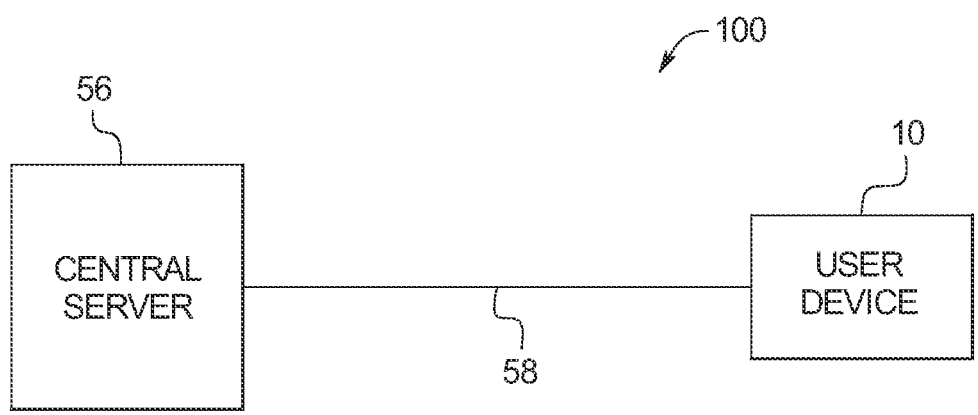
FIG. 1 is a schematic block diagram of one embodiment of a network configuration for a user device and a central controller, central server, or remote host of one embodiment of the gaming system disclosed herein.

As noted above, in various embodiments the gaming system includes a user device in combination with a central server, central controller, or remote host. In such embodiments, the user device is configured to communicate with the central server, central controller, or remote host through a data network or remote communication link. In certain such embodiments, the user device is configured to communicate with another user device through the same data network or remote communication link or through a different data network or remote communication link. For example, the gaming system illustrated in FIG. 1 includes a user device 10 that is configured to communicate with a central server, central controller, or remote host 56 through a data network 58.

In certain embodiments in which the gaming system includes a user device in combination with a central server, central controller, or remote host, the central server, central controller, or remote host is any suitable computing device (such as a server) that includes at least one processor and at least one memory device or storage device. As further described below, the user device includes at least one user device processor configured to transmit and receive data or signals representing events, messages, commands, or any other suitable information between the user device and the central server, central controller, or remote host. The at least one processor of that user device is configured to execute the events, messages, or commands represented by such data or signals in conjunction with the operation of the user device. Moreover, the at least one processor of the central server, central controller, or remote host is configured to transmit and receive data or signals representing events, messages, commands, or any other suitable information between the central server, central controller, or remote host and the user device. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the user device. In one example including a plurality of user devices in communication with one another via a peer-to-peer configuration, one of the user devices includes a "host" function such that that user device performs one or more functions of the central server, central controller, or remote host. It should be further appreciated that one, more, or each of the functions of the at least one processor of the user device may be performed by the at least one processor of the central server, central controller, or remote host.

In certain such embodiments, computerized instructions for controlling the fantasy sports game displayed by the user device are executed by the central server, central controller, or remote host. In such "thin client" embodiments, the central server, central controller, or remote host remotely controls the fantasy sports game (or other suitable interfaces) displayed by the user device, and the user device is utilized to display the fantasy sports game (or suitable interfaces) and to receive one or more inputs or commands. In other such embodiments, computerized instructions for controlling the fantasy sports game displayed by the user device are communicated from the central server, central controller, or remote host to the user device and are stored in at least one memory device of the user device. In such "thick client" embodiments, the at least one processor of the user device executes the computerized instructions to control the fantasy sports game (or other suitable interfaces) displayed by the user device.

In various embodiments in which the gaming system includes a plurality of user devices, one or more of the user devices are thin client user devices and one or more of the user devices are thick client user devices. In other embodiments in which the gaming system includes one or more user devices, certain functions of one or more of the user devices are implemented in a thin client environment, and certain other functions of one or more of the user devices are implemented in a thick client environment. In one such embodiment in which the gaming system includes a user device and a central server, central controller, or remote host, computerized instructions for controlling certain features of the fantasy sports game displayed by the user device are communicated from the central server, central controller, or remote host to the user device in a thick client configuration, and computerized instructions for controlling other features of the fantasy sports game displayed by the user device are executed by the central server, central controller, or remote host in a thin client configuration.

In certain embodiments in which the gaming system includes: (a) a user device configured to communicate with a central server, central controller, or remote host through a data network; and/or (b) a plurality of user devices configured to communicate with one another through a data network, the data network is a local area network (LAN) in which the user devices are located substantially proximate to one another and/or the central server, central controller, or remote host. In other embodiments in which the gaming system includes: (a) a user device configured to communicate with a central server, central controller, or remote host through a data network; and/or (b) a plurality of user devices configured to communicate with one another through a data network, the data network is a wide area network (WAN) in which one or more of the user devices are not necessarily located substantially proximate to another one of the user devices and/or the central server, central controller, or remote host. It should be appreciated that in certain embodiments in which the data network is a WAN, the gaming system includes a central server, central controller, or remote host and a user device each located in a different gaming establishment in a same geographic area, such as a same city or a same state. It should be appreciated that gaming systems in which the data network is a WAN are substantially identical to gaming systems in which the data network is a LAN, though the quantity of user devices in such gaming systems may vary relative to one another.

In further embodiments in which the gaming system includes: (a) a user device configured to communicate with a central server, central controller, or remote host through a data network; and/or (b) a plurality of user devices configured to communicate with one another through a data network, the data network is an internet or an intranet. In certain such embodiments, an internet browser of the user device is usable to access an internet game page from any location where an internet connection is available. In one such embodiment, after the internet game page is accessed (such as through a social networking website or through an application on a smart phone), the central server, central controller, or remote host identifies a player prior to enabling that player to utilize any features of the fantasy sports game (e.g., prior to enabling a player to create a fantasy sports team and/or enter a fantasy sports team into a competition). In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a unique player identification number associated with the player by the central server, central controller, or remote host.

It should be appreciated that the central server, central server, or remote host and the user device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of user devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

User Device Client Components

Figure 2:
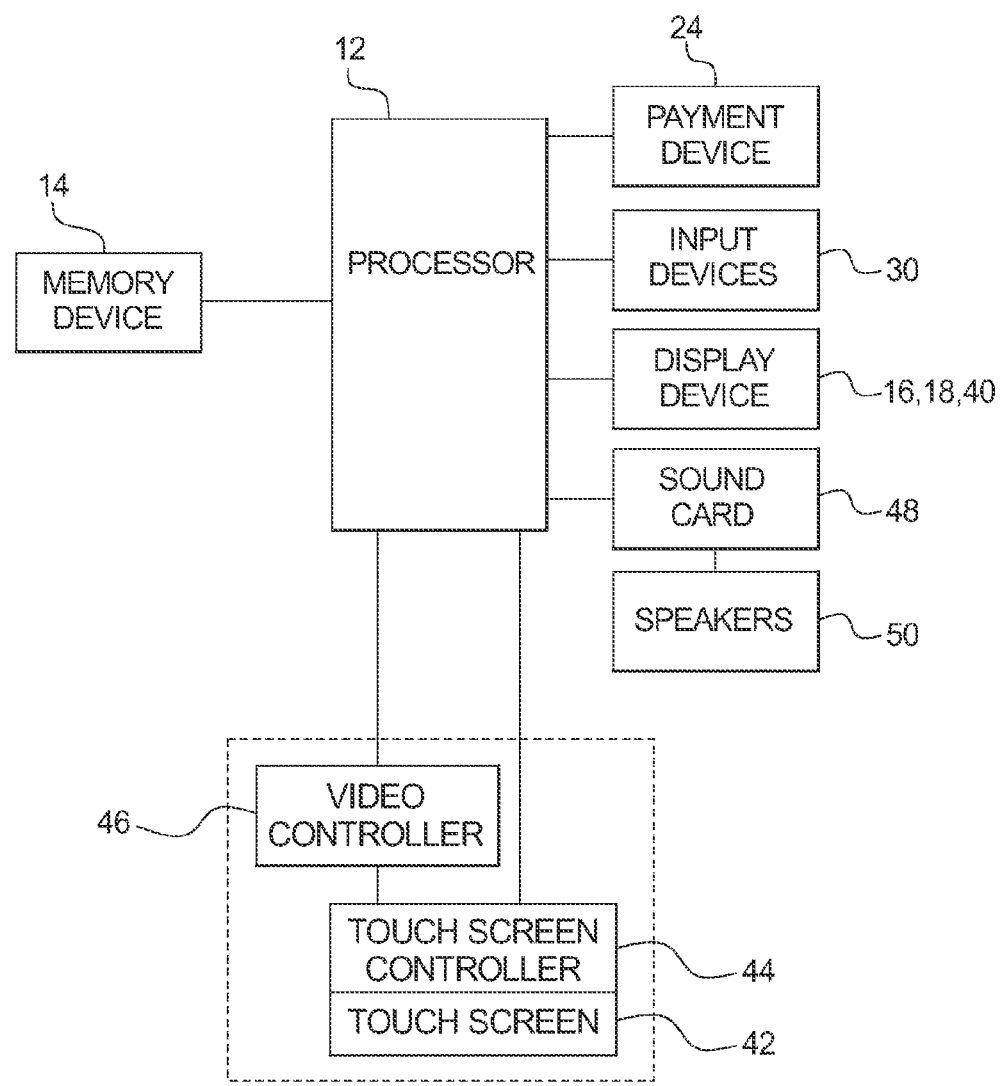
FIG. 2 is a schematic block diagram of one embodiment of an electronic configuration for one of the user devices of the gaming system disclosed herein.

In various embodiments, a user device includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 2 illustrates an example user device including a processor 12.

As generally noted above, the at least one processor of the user device is configured to communicate with, configured to access, and configured to exchange signals with at least one memory device or data storage device. In various embodiments, the at least one memory device of the user device includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the user device includes flash memory and/or EEPROM (electrically erasable programmable read only memory). The example user device illustrated in FIG. 2 includes a memory device 14. It should be appreciated that any other suitable magnetic, optical, and/or semiconductor memory may operate in conjunction with the user device disclosed herein.

In certain embodiments, as generally described above, the at least one memory device of the user device stores program code and instructions executable by the at least one processor of the user device to control the user device. The at least one memory device of the user device also stores other operating data, such as image data, event data, input data, random number generators (RNGs) or pseudo-RNGs, and/or applicable game rules that relate to the play the fantasy sports game on the user device. In certain embodiments, part or all of the program code and/or the operating data is downloaded to the at least one memory device of the user device through any suitable data network described above (such as an internet or intranet).

In various embodiments, the user device includes one or more input devices. The input devices may include any suitable device that enables an input signal to be produced and received by the at least one processor of the user device. The example user device illustrated in FIG. 2 includes at least one input device 30. One input device of the user device is a payment device configured to communicate with the at least one processor of the user device to fund the user device. The example user device illustrated in FIG. 2 includes a payment device 24. In one embodiment, the user device includes a payment device configured to enable the user device to be funded via an electronic funds transfer, such as a transfer of funds from a bank account.

In certain embodiments, one input device of the user device is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the user device by touching the touch screen at the appropriate locations. The example user device illustrated in FIG. 2 includes a touch screen 42 coupled to a touch screen controller 44 and connected to a video controller 46.

In various embodiments, the user device includes one or more output devices. One or more output devices of the user device are one or more display devices configured to display the fantasy sports game and any suitable information associated with such game(s). The example user device illustrated in FIG. 2 includes display devices 16, 18, and 40. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

In various embodiments, one output device of the user device is a payout device. In one embodiment, the user device includes a payout device configured to fund a bank account via an electronic funds transfer.

In certain embodiments, one output device of the user device is a sound generating device controlled by one or more sound cards. In one such embodiment, the sound generating device includes one or more speakers or other sound generating hardware and/or software for generating sounds, such as by playing music for the fantasy sports game. The example user device illustrated in FIG. 2 includes speakers 50 connected to a sound card 48. In another such embodiment, the user device provides dynamic sounds coupled with attractive multimedia images displayed on one or more of the display devices to provide an audio-visual representation or to otherwise display full-motion video with sound to attract players to the user device.

In various embodiments, the user device includes a plurality of communication ports configured to enable the at least one processor of the user device to communicate with and to operate with external peripherals, such as touch screens, touchpads, and wireless communication devices.

General Operation of Fantasy Sports Game

In various embodiments, a user device may be implemented in one of a variety of different configurations. In various embodiments, the user device may be implemented as one of: (a) a dedicated user device wherein computerized game programs executable by the user device for controlling the fantasy sports game displayed by the user device are provided with the user device prior to delivery to a gaming establishment or prior to being provided to a player; and (b) a changeable user device wherein computerized game programs executable by the user device for controlling the fantasy sports game displayed by the user device are downloadable to the user device through a data network or remote communication link after the user device is physically located in a gaming establishment or after the user device is provided to a player.

As generally explained above, in various embodiments in which the gaming system includes a central server, central controller, or remote host and a changeable user device, the at least one memory device of the central server, central controller, or remote host stores game programs and instructions executable by the at least one processor of the changeable user device to control the fantasy sports game displayed by the changeable user device. In operation of such embodiments, the central server, central controller, or remote host is configured to communicate one or more of the stored executable game programs to the at least one processor of the changeable user device. In different embodiments, a stored executable game program is communicated or delivered to the at least one processor of the changeable user device by: (a) embedding the executable game program in a device or a component (such as a microchip to be inserted into the changeable user device); (b) writing the executable game program onto a disc or other media; or (c) uploading or streaming the executable game program over a data network (such as a dedicated data network). After the executable game program is communicated from the central server, central controller, or remote host to the changeable user device, the at least one processor of the changeable user device executes the executable game program to enable the fantasy sports game associated with that executable game program to be played using the display device(s) and/or the input device(s) of the changeable user device.

In certain embodiments, the gaming system randomly determines any game outcome(s) for a play of a primary game. In certain such embodiments, this random determination is provided through utilization of an RNG, such as a true RNG or a pseudo RNG, or any other suitable randomization process. In one such embodiment, each game outcome is associated with a probability, and the gaming system generates the game outcome(s) to be provided based on the associated probabilities. In these embodiments, since the gaming system generates game outcomes and/or awards randomly or based on one or more probability calculations, there is no certainty that the gaming system will ever provide any specific game outcome and/or award.

In various embodiments, and as discussed in more detail below, the gaming system determines, for each fantasy sports team in a competition, for each athlete on that fantasy sports team, a cumulative simulated performance of that athlete based on designated historical performance data of that athlete and probability data, such as a probability distribution (explained below). In one such embodiment, this determination is provided through utilization of a random number generator (RNG), such as a true RNG, a pseudo RNG, or other suitable randomization process. In another such embodiment, this determination is provided at least in part based on a random action performed by a player.

In various embodiments, the gaming system includes one or more player tracking systems. Such player tracking systems enable operators of the gaming system to recognize the value of customer loyalty by identifying frequent customers and rewarding them for their patronage. Such a player tracking system is configured to track a player's gaming activity. In such embodiments, during one or more gaming sessions, the gaming system tracks any suitable information or data, such as any fees paid, a quantity of competitions entered, and/or an amount of any fees paid. In different embodiments, for one or more players, the player tracking system includes the player's account number, the player's card number, the player's birthday, the player's anniversary, the player's recent gaming sessions, or any other suitable data. At least U.S. Pat. Nos. 6,722,985; 6,908,387; 7,311,605; 7,611,411; 7,617,151; and 8,057,298 describe various examples of player tracking systems.

Fantasy Sports Game

Various embodiments of the present disclosure provide a gaming system and method providing a fantasy sports game. In general, the gaming system is configured to enable a player to create a fantasy sports team associated with a real-life sports league (referred to herein as a "sports league"). The gaming system enables the player to select one or more real-life athletes (referred to herein as "athletes") who play or have played in that sports league to include on the player's fantasy sports team. The gaming system enables the player to enter the player's fantasy sports team into a competition in which the player's fantasy sports team competes against one or more other fantasy sports teams that each include one or more of the athletes who play or have played in that sports league. For each of the fantasy sports teams in the competition, for one or more of the athletes on that fantasy sports team, the gaming system: (a) determines a cumulative simulated performance of that athlete for the competition based at least in part on designated historical performance data of that athlete over a designated period, and (b) determines a cumulative athlete score of that athlete for the competition based on the cumulative simulated performance of that athlete. For each of the fantasy sports teams in the competition, the gaming system determines a total team score associated with that fantasy sports team by summing the cumulative athlete scores of one or more of the athletes on that fantasy sports team. The gaming system determines which of the fantasy sports teams in the competition has the highest total team score, and identifies that fantasy sports team as the winner of the competition.

As generally explained above, the gaming system enables a player to create a fantasy sports team associated with one or more professional, semi-professional, amateur, or other real-life sports leagues, such as (but not limited to): the Association of Volleyball Professionals (AVP), the Canadian Football League (CFL), the English Premier League, independent baseball leagues, the Kontinental Hockey League (KHL), the Ladies Professional Golf Association (LPGA), Major League Baseball (MLB), Major League Soccer (MLS), minor league baseball leagues, Mixed Martial Arts (MMA), NASCAR, the National Basketball Association (NBA), the National Football League (NFL), the National Hockey League (NHL), the Professional Golf Association (PGA), the Women's National Basketball Association (WNBA), and Women's Professional Soccer (WPS).

In certain embodiments, the gaming system enables the player to create a fantasy sports team associated with a single designated one of the sports leagues. In these embodiments, as explained in detail below, the gaming system enables the player to select only athletes who play in the designated one of the sports leagues to include on the player's fantasy sports team. For example, the gaming system enables the player to create a fantasy sports team associated with the NFL. In this example, the gaming system enables the player to select only athletes who play in the NFL to include on the player's fantasy sports team. That is, in this example, the player's fantasy sports team does not include athletes who only play in: (a) the NHL, (b) MLB, (c) the NBA, or (d) any of the other sports leagues. In other embodiments, the gaming system enables the player to create a fantasy sports team associated with a plurality of the sports leagues. In these embodiments, as explained in detail below, the gaming system enables the player to select athletes who play in one or more of the plurality of the sports leagues to include on the player's fantasy sports team. For example, the gaming system enables the player to create a fantasy sports team associated with the NFL, the NHL, the MLB, and the NBA. In this example, the gaming system enables the player to select two athletes who play in the NFL, three athletes who play in the NHL, two athletes who play in the MLB, and four athletes who play in the NBA to include on the player's fantasy sports team. In further embodiments, the gaming system enables the player to create a fantasy sports team associated with a plurality of the sports leagues, wherein each of the plurality of the sports leagues is associated with a same sport. In these embodiments, as explained in detail below, the gaming system enables the player to select athletes who play in the plurality of the sports leagues to include on the player's fantasy sports team. For example, the gaming system enables the player to create a fantasy sports team associated with the NHL and the American Hockey League (AHL), each of which is associated with the sport of hockey. In this example the gaming system enables the player to select athletes from the NHL, AHL, or both to include on the player's fantasy sports team.

In various embodiments, a fantasy sports team includes a designated quantity of each of one or more of a plurality of athlete positions. In one embodiment, the designated quantity is the same for each of the athlete positions. In another embodiment, the designated quantity is different for at least two of the athlete positions. Generally, each of the athlete positions is configured to be occupied by one of the athletes on the player's fantasy sports team, as further described below. More specifically, each athlete position is typically a position configured to be occupied by one or more athletes who play in the sports league or leagues with which the fantasy sports team is associated. For example, a fantasy sports team associated with the NFL includes a designated quantity of each of one or more of the following athlete positions: a quarterback athlete position, a running back athlete position, a wide receiver athlete position, a tight end athlete position, a kicker athlete position, a defense/special teams athlete position, and a bench athlete position. In one instance, a fantasy sports team associated with the NFL includes the following designated quantities of the following athlete positions: one quarterback athlete position, two running back athlete positions, three wide receiver athlete positions, one tight end athlete position, one kicker athlete position, one defense/special teams athlete position, and four bench athlete positions. It should be appreciated that certain of the athlete positions are configured to be occupied by a group including a plurality of athletes. For example, the defense/special teams athlete position is configured to be occupied by a group of athletes, which is typically a group including the defensive athletes of a given team of the NFL. In another example, the wide receiver athlete position is configured to be occupied by a group of athletes, which is typically a group including all of the wide receivers of a given team of the NFL.

As generally discussed above, each of the athlete positions of a fantasy sports team is configured to be occupied by one of the athletes of the player's fantasy sports team. In certain embodiments, each of the athletes that the gaming system enables the player to select to include on the player's fantasy sports team, as discussed below, is associated with an athlete position eligibility. The athlete position eligibility of an athlete determines which of the athlete positions of a fantasy sports team that that athlete is configured to occupy. For example, the gaming system enables a player to select athlete Max Hannon to include on the player's fantasy sports team, which is associated with the NFL. Athlete Max Hannon has running back athlete position eligibility and wide receiver athlete position eligibility. Thus, in this example, if the player selects athlete Max Hannon to include on the player's fantasy sports team, the gaming system enables athlete Max Hannon to occupy either the running back athlete position or the wide receiver athlete position of the player's fantasy sports team.

In various embodiments, certain of the athlete positions are active athlete positions, and certain of the athlete positions are inactive athlete positions. As explained in detail below, for each fantasy sports team in a competition, the total team score for that fantasy sports team at the conclusion of the competition is based at least in part on the cumulative athlete scores of athletes occupying active athlete positions of that fantasy sports team, and not based on the cumulative athlete scores of athletes occupying inactive athlete positions of that fantasy sports team. In one example in which a fantasy sports team is associated with the NFL, the quarterback athlete position, the running back athlete position, the wide receiver athlete position, the tight end athlete position, the kicker athlete position, and the defense/special teams athlete position are each active athlete positions, and the bench athlete position is an inactive athlete position.

Once the gaming system has created a player's fantasy sports team that: (a) is associated with one or more sports leagues, and (b) includes a designated quantity of each of one or more of a plurality of athlete positions associated with those one or more sports leagues, the gaming system enables the player to select one or more athletes who play or have played in those sports leagues to include on the player's fantasy sports team. In one embodiment, the gaming system enables the player to select one or more athletes who currently play in those sports leagues to include on the player's fantasy sports team. In another embodiment, the gaming system enables the player to select one or more athletes who previously played in those sports leagues to include on the player's fantasy sports team. For example, the gaming system enables the player to select only retired athletes to include on the player's fantasy sports team. In a further embodiment, the gaming system enables the player to select one or more athletes who currently play in those sports leagues to include on the player's fantasy sports team and one or more athletes who previously played in those sports leagues to include on the player's fantasy sports team. For example, the gaming system enables the player to select a designated quantity of current athletes and a designated quantity of retired athletes to include on the player's fantasy sports team.

In certain embodiments, the gaming system enables the player to select a quantity of athletes equal to the quantity of athlete positions of the player's fantasy sports team. For example, if a player's fantasy sports team includes thirteen athlete positions, the gaming system enables the player to select thirteen athletes, one for each of the athlete positions. It should be appreciated that, in other embodiments, the gaming system enables a player to select a quantity of athletes that is: (a) less than the quantity of athlete positions of the player's fantasy sports team, or (b) greater than the quantity of athlete positions of the player's fantasy sports team.

In one embodiment, the gaming system requires a player to select the athletes to include on the player's fantasy sports team such that each of the active athlete positions of the player's fantasy sports team is configured to be occupied by a different one of the selected athletes. For example, if a player's fantasy sports team includes one quarterback active athlete position, two running back active athlete positions, three wide receiver active athlete positions, one tight end active athlete position, one kicker active athlete position, one defense/special teams active athlete position, and four bench inactive athlete positions, the gaming system requires the player to select athletes to include on the player's fantasy sports team such that a different selected athlete occupies each of: the one quarterback active athlete position, the two running back active athlete positions, the three wide receiver active athlete positions, the one tight end active athlete position, the one kicker active athlete position, and the one defense/special teams active athlete position. In other words, in this embodiment the player must select athletes such that, after selection is complete, all of the active athlete positions of the player's fantasy sports team may be simultaneously occupied by athletes having the requisite athlete position eligibility. It should be appreciated that, in another embodiment, the gaming system does not include such a requirement. For example, although it may not be beneficial to the player in some instances, the gaming system enables a player to select thirteen athletes having only running back athlete position eligibility.

In various embodiments, the gaming system enables a player to select athletes to include on the player's fantasy sports team independent of any selection of any athletes to include on any other fantasy sports teams. It should thus be appreciated that, in these embodiments, a plurality of fantasy sports teams associated with a same one of or a same plurality of the sports leagues may each include a same one of the athletes. In one such embodiment, the gaming system enables a designated quantity of the fantasy sports teams to include a same one of the athletes, the designated quantity being less than the quantity of fantasy sports teams. It should also be appreciated, however, that in certain of these embodiments a single fantasy sports team may not include a plurality of a same athlete (e.g., a fantasy sports team may not include two of the same quarterback in these embodiments). More specifically, in these embodiments, the gaming system enables the player to select, without replacement, which athletes to include on the player's fantasy sports team from a pool of athletes who play in the one or more sports leagues with which the player's fantasy sports team is associated. In various embodiments, the pool of athletes: (a) includes all of the athletes who play in the one or more sports leagues with which the player's fantasy sports team is associated; (b) includes fewer than all of the athletes who play in the one or more sports leagues with which the player's fantasy sports team is associated; (c) for each athlete position eligibility, includes a designated quantity of athletes that have athlete position eligibility; and/or (d) includes athletes whose designated historical performance data (explained below) meets one or more requirements.

In another embodiment, the gaming system enables the player to select, without replacement, which athletes to include on the player's fantasy sports team from a plurality of pools of athletes who play in the one or more sports leagues with which the player's fantasy sports team is associated. For example, the gaming system includes, for each athlete position, one pool of athletes having position eligibility for that athlete position.

In one embodiment, each of the athletes in the pool of athletes from which a player selects athletes to include on the player's fantasy sports team is associated with a quantity of credits. In this embodiment, highly-rated athletes are associated with relatively higher quantities of credits than lower-rated athletes. The gaming system provides the player with a designated quantity of credits that the player uses to "purchase" athletes for the player's fantasy sports team. Each time the player selects one of the athletes from the pool, the gaming system deducts the quantity of credits associated with that athlete from the player's quantity of credits. The player selects athletes until the player's quantity of credits expires or until the player has too few credits to purchase another athlete.

In other embodiments, the player's ability to select athletes to include on the player's fantasy sports team is dependent on the selection of athletes to include on one or more other fantasy sports teams. In one embodiment, the gaming system enables the player and other players (which may be computer players, as described below) to sequentially select, according to a designated order and without replacement, which athletes to include on the players' fantasy sports teams from a pool of athletes who play in the one or more sports leagues with which the players' fantasy sports teams are associated. In various embodiments, the pool of athletes: (a) includes all of the athletes who play in the one or more sports leagues with which the player's fantasy sports team is associated; (b) includes fewer than all of the athletes who play in the one or more sports leagues with which the player's fantasy sports team is associated; (c) for each athlete position eligibility, includes a designated quantity of athletes that athlete position eligibility; and/or (d) includes athletes whose designated historical performance data (explained below) meets one or more requirements. In another embodiment, the gaming system enables the player and the other players to select, in a free-for-all fashion and without replacement, which athletes to include on the players' fantasy sports teams from a pool of athletes who play in the one or more sports leagues with which the players' fantasy sports teams are associated. More specifically, in this embodiment, each of the players may simultaneously select athletes from the pool. It should be appreciated that the pool may be any of the above-described pools.

Each of the athletes in the pool of athletes from which fantasy sports teams are selected is associated with designated historical performance data. In certain embodiments, the gaming system stores the designated historical performance data in one or more storages devices. In various embodiments, at least one storage device is a database on a central server, central controller, or remote host, which in certain instances is located at a location remote from a location of a user device. For each of the athletes, the designated historical performance data of that athlete represents the real-life performance of that athlete over a designated period. In various embodiments, the designated period is: (a) that athlete's entire career; (b) a designated portion of that athlete's entire career, such as the previous season or the previous three seasons of the sports league in which that athlete plays; (c) a designated quantity of that athlete's best games; (d) a designated quantity of that athlete's worst games; or (e) a designated quantity of that athlete's games excluding one or more of that athlete's best games and/or one or more of that athlete's worse games.

More specifically, for each of the athletes, the designated historical performance data of that athlete includes designated historical performance statistics in one or more statistical categories that represent that athlete's performance over the designated period. In various embodiments, for each of the athletes, the designated historical performance statistics of that athlete include one or more of: (a) a cumulative compilation of statistics for each of the statistical categories (e.g., that athlete has scored 133 touchdowns over the designated period); (b) a per-game average statistic for each of the statistical categories (e.g., that athlete averages 1.2 touchdowns per game over the designated period); and (c) a per-season average statistic for each of the statistical categories (e.g., that athlete averages 19.2 touchdowns per season over the designated period).

In embodiments in which a player's fantasy sports team: (a) includes both active athlete positions and inactive athlete positions, and/or (b) includes one or more athletes having multiple athlete position eligibility (e.g., two athletes each having running back athlete position eligibility and wide receiver athlete position eligibility), the gaming system enables the player to choose which of the athletes on the player's fantasy sports team will occupy each of the active athlete positions and each of the inactive athlete positions (if any). As explained above, the athlete position eligibility of an athlete determines which of the athlete positions that athlete is configured to occupy. In certain embodiments, the gaming system does not enable a player to enter a competition (described below) unless each active athlete position (and, in one embodiment, each inactive athlete position) is occupied by one of the athletes on the player's fantasy sports team.

In various embodiments, once a player has created a fantasy sports team and has selected players to include on the player's fantasy sports team, the gaming system enables a player to enter a competition in which the player's fantasy sports team competes against one or more other fantasy sports teams, wherein each of the other fantasy sports teams includes one or more of the athletes who play in the sports league or leagues with which the player's fantasy sports team is associated. In various embodiments, the gaming system enables the player to enter a competition via a website, such as a social networking website. In these embodiments, the player loads the website on a user device, such as a computer, and indicates the player's desire to enter the player's fantasy sports team into a competition. The gaming system creates a new competition or adds the player's fantasy sports team to an existing competition that requires more fantasy sports teams. It should be appreciated that the competition provides the player with random opponents or familiar opponents (such as friends of the player). Once a designated quantity of fantasy sports teams are entered into the competition with the player, the gaming system initiates the competition.

As generally explained above, the gaming system enables a player to enter a competition in which the player's fantasy sports team competes against one or more other fantasy sports teams, wherein each of the other fantasy sports teams includes one or more of the athletes who play in the sports league or leagues with which the player's fantasy sports team is associated. That is, in certain embodiments, the gaming system does not enable a fantasy sports team associated with a designated sports league or designated sports leagues to compete against another fantasy sports team associated with a different sports league or different sports leagues. In various embodiments, the competition represents: (a) a designated portion of a game of the sports league or leagues with which the fantasy sports teams are associated, (b) a single game of the sports league or leagues with which the fantasy sports teams are associated, or (c) a plurality of games of the sports league or leagues with which the fantasy sports teams are associated. For example, a competition including fantasy sports teams associated with the NFL represents: (a) one, two, or three quarters of a football game; (b) an entire football game; or (c) an entire football regular season (i.e., sixteen football games).

In various embodiments, the gaming system requires the player to pay a fee, such as an amount of currency, a quantity of monetary credits, or a quantity of non-monetary credits (i.e., credits not redeemable for value), to enter the competition. In other embodiments, the gaming system does not require the player to pay a fee to enter the competition. In one embodiment, the gaming system enables a player to enter a competition if the player has already created a fantasy sports team and has already selected athletes to include on the player's fantasy sports team. In another embodiment, the gaming system enables a player to enter a competition and then create a fantasy sports team and select athletes to include on the player's fantasy sports team.

In various embodiments, upon the initiation of a competition, for each of the fantasy sports teams in the competition, for each of the athletes occupying one of the active athlete positions of that fantasy sports team, the gaming system determines a cumulative simulated performance of that athlete for the competition using the designated historical performance data of that athlete. More specifically, each of the active athlete positions is associated with a plurality of statistical categories. For each of the fantasy sports teams in the competition, for each of the athletes occupying one of the active athlete positions of that fantasy sports team, the gaming system determines cumulative simulated performance statistics for that athlete for each of the plurality of statistical categories based, at least in part, on the designated historical performance data of that athlete.

For example, for a competition including a plurality of fantasy sports teams associated with the NFL in which each of the fantasy sports teams includes an active quarterback athlete position, the active quarterback athlete position is associated with the following statistical categories: (a) quantity of passes attempted; (b) quantity of passes completed; (c) completion percentage (i.e., (passes completed)/(passes attempted)); (d) quantity of passing yards; (e) quantity of passing touchdowns thrown; (f) quantity of interceptions thrown; (g) quantity of rushing yards; (h) quantity of rushing touchdowns; (i) quantity of receiving yards; (j) quantity of receiving touchdowns; and (k) quantity of fumbles lost. Thus, in this example, for each of the fantasy sports teams in the competition, for each of the athletes occupying the active quarterback athlete position of that fantasy sports team, the gaming system uses designated historical performance data of that athlete to determine, for the competition: (a) a total simulated quantity of passes attempted by that athlete; (b) a total simulated quantity of passes completed by that athlete; (c) a total simulated completion percentage of that athlete (i.e., (passes completed)/(passes attempted)); (d) a total simulated quantity of passing yards of that athlete; (e) a total simulated quantity of passing touchdowns thrown by that athlete; (f) a total simulated quantity of interceptions thrown by that athlete; (g) a total simulated quantity of rushing yards of that athlete; (h) a total simulated quantity of rushing touchdowns of that athlete; (i) a total simulated quantity of receiving yards of that athlete; (j) a total simulated quantity of receiving touchdowns of that athlete; and (k) a total simulated quantity of fumbles lost by that athlete.

In one embodiment, for each of the fantasy sports teams in the competition, for each of the athletes occupying one of the active athlete positions of that fantasy sports team, the gaming system determines the cumulative simulated performance of that athlete for the competition by: (a) determining zero, one, or a plurality of individual competition events associated with that athlete based at least in part on that athlete's historical data; (b) determining individual competition event simulated performance statistics associated with that individual competition event for that athlete for each of the plurality of statistical categories associated with that active athlete position based at least in part on that athlete's designated historical performance data; and (c) summing the corresponding individual competition event simulated performance statistics, resulting in the cumulative simulated performance statistics for that athlete for each of the plurality of statistical categories associated with that active athlete position. Table 1 below includes example individual competition events and the associated individual competition event simulated performance statistics determined by the gaming system for a competition for an athlete occupying the active quarterback athlete position of a fantasy sports team associated with the NFL. Table 2 below illustrates the cumulative simulated performance statistics for that athlete.

TABLE 1

Example Individual Competition Events and Associated Individual Competition Event Simulated Performance Statistics for an Athlete Occupying the Active Quarterback Athlete Position of a Fantasy Sports Team Associated With the NFL

| Individual Competition Event | Individual Competition Event Simulated Performance Statistics | | | | | | | | | | |
|---|---|---|---|---|---|---|---|---|---|---|---|
| | Pass Att. | Pass Comp. | Compl. % | Pass Yds. | Pass TDs | Int. | Rush Yds. | Rush TDs | Rec. Yds. | Rec. TDs | Fumb. Lost |
| Inc. | 1 | 0 | 0% | 0 | 0 | 0 | 0 | 0 | 0 | 0 | 0 |
| 18 yd. comp. | 1 | 1 | 100% | 18 | 0 | 0 | 0 | 0 | 0 | 0 | 0 |
| Fumble lost | 0 | 0 | n/a | 0 | 0 | 0 | 0 | 0 | 0 | 0 | 1 |
| 35 yd. TD pass | 1 | 1 | 100% | 35 | 1 | 0 | 0 | 0 | 0 | 0 | 0 |
| Int. | 1 | 0 | 0% | 0 | 0 | 1 | 0 | 0 | 0 | 0 | 0 |
| 14 yd. comp. | 1 | 1 | 100% | 14 | 0 | 0 | 0 | 0 | 0 | 0 | 0 |
| 10 yd. rush | 0 | 0 | n/a | 0 | 0 | 0 | 10 | 0 | 0 | 0 | 0 |
| 24 yd. TD pass | 1 | 1 | 100% | 24 | 1 | 0 | 0 | 0 | 0 | 0 | 0 |
| Int. | 1 | 0 | 0% | 0 | 0 | 1 | 0 | 0 | 0 | 0 | 0 |
| 20 yd. comp. | 1 | 1 | 100% | 20 | 0 | 0 | 0 | 0 | 0 | 0 | 0 |
| 23 yd. comp. | 1 | 1 | 100% | 23 | 0 | 0 | 0 | 0 | 0 | 0 | 0 |
| 24 yd. TD pass | 1 | 1 | 100% | 24 | 1 | 0 | 0 | 0 | 0 | 0 | 0 |
| Inc. | 1 | 0 | 0% | 0 | 0 | 0 | 0 | 0 | 0 | 0 | 0 |
| 20 yd. comp. | 1 | 1 | 100% | 20 | 0 | 0 | 0 | 0 | 0 | 0 | 0 |
| 20 yd. comp. | 1 | 1 | 100% | 20 | 0 | 0 | 0 | 0 | 0 | 0 | 0 |
| Inc. | 1 | 0 | 0% | 0 | 0 | 0 | 0 | 0 | 0 | 0 | 0 |
| 22 yd. comp. | 1 | 1 | 100% | 22 | 0 | 0 | 0 | 0 | 0 | 0 | 0 |

TABLE 1-continued

Example Individual Competition Events and Associated Individual
Competition Event Simulated Performance Statistics for an Athlete Occupying the
Active Quarterback Athlete Position of a Fantasy Sports Team Associated With the NFL

| Individual Competition Event | Individual Competition Event Simulated Performance Statistics | | | | | | | | | | |
|---|---|---|---|---|---|---|---|---|---|---|---|
| | Pass Att. | Pass Comp. | Compl. % | Pass Yds. | Pass TDs | Int. | Rush Yds. | Rush TDs | Rec. Yds. | Rec. TDs | Fumb. Lost |
| 20 yd. TD pass | 1 | 1 | 100% | 20 | 1 | 0 | 0 | 0 | 0 | 0 | 0 |
| 20 yd. comp. | 1 | 1 | 100% | 20 | 0 | 0 | 0 | 0 | 0 | 0 | 0 |
| 23 yd. comp. | 1 | 1 | 100% | 23 | 0 | 0 | 0 | 0 | 0 | 0 | 0 |
| 17 yd. comp. | 1 | 1 | 100% | 17 | 0 | 0 | 0 | 0 | 0 | 0 | 0 |

TABLE 2

Example Cumulative simulated performance Statistics for the Athlete of Table 1
Cumulative simulated performance Statistics

| Pass Att. | Pass Comp. | Compl. % | Pass Yds. | Pass TDs | Int. | Rush Yds. | Rush TDs | Rec. Yds. | Rec. TDs | Fumb. Lost |
|---|---|---|---|---|---|---|---|---|---|---|
| 19 | 14 | 73.7% | 300 | 4 | 2 | 10 | 0 | 0 | 0 | 1 |

In various embodiments, the gaming system is configured to cause a display of an indication representing one or more of the individual competition events. In one embodiment, the gaming system causes a display of an indication representing an individual competition event to the player whose fantasy sports team includes the athlete associated with that individual competition event. In another embodiment, the gaming system causes a display of an indication representing an individual competition event to a plurality of the players whose fantasy sports teams are participating in the competition. In one embodiment, the gaming system causes a display of an indication representing an individual competition event in real time, i.e., when or shortly thereafter the gaming system determines that individual competition event. It should be appreciated that the indication representing the individual competition event may be any suitable indication, such as (but not limited to): a text message, an email, a printout, an animated event, or a prerecorded video event. In other embodiments, the gaming system causes audible indications of the individual competition event instead of or in addition to visual indications.

In one embodiment, for each of the fantasy sports teams in the competition, for each of the athletes occupying one of the active athlete positions of that fantasy sports team, the gaming system directly determines the cumulative simulated performance statistics for that athlete based on a probability distribution derived from the designated historical performance data of that athlete. This process is explained below with respect to a single athlete for clarity. In this embodiment, the designated historical performance data for the athlete includes statistics representing that athlete's average per-game performance over the course of that athlete's entire career. For example, the athlete is a running back and averages 90 rushing yards per game and 0.8 touchdowns per game over the course of the athlete's entire career. The gaming system determines a probability distribution for that athlete associated with the designated historical performance data that includes probabilities that the gaming system will determine: (a) that the athlete's cumulative simulated performance is greater than the average, (b) that the athlete's cumulative simulated performance is equal to the average, or (c) that the athlete's cumulative simulated performance is less than the average. In this example, the gaming system determines the following probability distribution: (a) 50% chance that the gaming system will determine the athlete's cumulative simulated performance to be equal to the average, (b) 20% chance that the gaming system will determine the athlete's cumulative simulated performance to be 20% less than the average, (c) 20% chance that the gaming system will determine the athlete's cumulative simulated performance to be 20% greater than the average, (d) 5% chance that the gaming system will determine the athlete's cumulative simulated performance to be 40% less than the average, and (e) 5% chance that the gaming system will determine the athlete's cumulative simulated performance to be 40% greater than the average. In this embodiment, when that athlete occupies one of the active athlete positions of one of the fantasy sports teams in the competition, the gaming system randomly determines, based on the probability distribution, the player's cumulative simulated performance. While the above-discussed method is one manner of determining the player's cumulative simulated performance, it should be appreciated that any suitable method may be employed.

Although the gaming system's determination of athletes' cumulative simulated performance is described above with respect to athletes occupying active athlete positions of fantasy sports teams, it should be appreciated that, in other embodiments, the gaming system determines the cumulative simulated performance of athletes occupying inactive athlete positions of fantasy sports teams. More specifically, in these embodiments, for each of the fantasy sports teams in the competition, for each of the athletes occupying an inactive athlete position of that fantasy sports team, the gaming system determines the cumulative simulated performance statistics for that athlete for each active athlete position that athlete is configured to occupy. It should be appreciated that the gaming system may make such a determination in any of the above manners. For example, if an athlete having running back athlete position eligibility and wide receiver athlete position eligibility is occupying an inactive athlete position, such as the bench athlete position, the gaming system determines cumulative simulated performance statistics for that athlete: (a) as if that athlete was occupying the running back active athlete position, and (b) as if that athlete was occupying the wide receiver active athlete position.

In various embodiments, for each of the fantasy sports teams in the competition, for each of the athletes occupying one of the athlete positions of that fantasy sports team, the gaming system determines the cumulative simulated performance of that athlete: (a) based at least in part on the designated historical performance data of that athlete, (b) independent of any cumulative simulated performance of or any designated historical performance data of any of the other athletes on that fantasy sports team, and (c) independent of any cumulative simulated performance of or any designated historical performance data of any other athletes on any of the other fantasy sports teams in the competition. In one of these embodiments, for each of the fantasy sports teams in the competition, for each of the athletes occupying one of the athlete positions of that fantasy sports team, the gaming system determines the cumulative simulated performance of that athlete based solely on the designated historical performance data associated with that athlete.

In certain embodiments, for each of the fantasy sports teams in the competition, for each of the athletes occupying one of the athlete positions of that fantasy sports team, the gaming system determines the cumulative simulated performance of that athlete: (a) based at least in part on the designated historical performance data of that athlete, (b) based at least in part on any cumulative simulated performance of and/or any designated historical performance data of one or more of the other athletes on that fantasy sports team, and (c) independent of any of the other athletes on any of the other fantasy sports teams in the competition. For example, a fantasy sports team associated with the NFL includes a relatively highly-rated athlete occupying the active quarterback athlete position and a relatively low-rated athlete occupying the active wide receiver athlete position. In this example, the gaming system may determine a cumulative simulated performance for the athlete occupying the active quarterback athlete position to be lower than usual due to the below-average athlete occupying the active wide receiver position, and vice-versa. It should thus be appreciated that, in these embodiments, the choice of which athletes to occupy which active athlete positions may alter the cumulative simulated performances of those athletes.

In other embodiments, for each of the fantasy sports teams in the competition, for each of the athletes occupying one of the athlete positions of that fantasy sports team, the gaming system determines the cumulative simulated performance of that athlete: (a) based at least in part on the designated historical performance data of that athlete, (b) based at least in part on any cumulative simulated performance of and/or any designated historical performance data of one or more of the other athletes on that fantasy sports team, and (c) based at least in part on any cumulative simulated performance of and/or any designated historical performance data of one or more of the other athletes of one or more of the other fantasy sports teams in the competition. For example, in a head to head competition between the fantasy sports teams of two players, the cumulative simulated performances of the athletes occupying the active offensive athlete positions of each of the fantasy sports teams are determined based at least in part on the designated historical performance data of the athletes occupying the active defense/special teams athlete position of the competitor fantasy sports team.

In various embodiments, the gaming system associates one or more conditions with a competition, and determines the cumulative simulated performances of the athletes of the fantasy sports teams in that competition based at least in part on those conditions. In various embodiments, the conditions include one or more of the following: (a) stadium type (e.g., outdoor field or dome); (b) temperature (e.g., below freezing, cold, mild, warm, hot, scorching); (c) wind conditions (e.g., direction and speed); and (d) precipitation conditions (e.g., rain or snow and rate of precipitation).

It should be appreciated from the above explanation that in certain embodiments in which a plurality of fantasy sports teams in a competition each include a same athlete occupying one of the athlete positions, the gaming system determines a single cumulative simulated performance for that athlete. That is, in these embodiments, that athlete's cumulative simulated performance is the same across all of the fantasy sports teams in the competition including that athlete occupying one of the athlete positions. It other embodiments, however, the gaming system independently determines a cumulative simulated performance for each instance of that athlete in the competition. For example, if Team 1 includes Athlete 1 occupying an active athlete position and Team 2 includes Athlete 1 occupying an active athlete position, the gaming system determines a cumulative simulated performance for Athlete 1 of Team 1 and independently determines a cumulative simulated performance for Athlete 1 of Team 2. Thus, in these embodiments, that athlete's cumulative simulated performance may be different for each of the fantasy sports teams in the competition.

In certain embodiments, the gaming system initiates the competition at a designated time. In other embodiments, the gaming system enables one or more players to cause the competition to be initiated on-demand. That is, in these embodiments, the players determine when gaming system initiates the competition.

It should be appreciated that each of the fantasy sports teams in the competition may be controlled by either a player or a computer. In one embodiment, if a player desires to initiate an on-demand competition and no other player is available, the gaming system provides a computer-controlled fantasy sports team against which the player's fantasy sports team may compete.

In various embodiments, for each of the fantasy sports teams in a competition, for each of the athletes occupying one of the active athlete positions of that fantasy sports team, the gaming system determines a cumulative athlete score, typically measured in points, associated with that athlete based on the cumulative simulated performance of that athlete. More specifically, the competition is associated with one or more scoring databases that correlate each of one or more simulated performance statistics with a point value. Tables 3 to 5 below illustrate example scoring databases for a competition including a plurality of fantasy sports teams associated with the NFL. More particularly: (1) Table 3 shows an example scoring database for offensive athlete positions (e.g., quarterback, running back, wide receiver, and tight end) that correlates the simulated performance statistics of the athletes occupying such athlete positions with point values used to determine the cumulative athlete scores of the athletes occupying such athlete positions; Table 4 shows an example scoring database for the kicker athlete position that correlates the simulated performance statistics of the athletes occupying such athlete position with point values used to determine the cumulative athlete scores of the athletes occupying such athlete position; and Table 5 shows an example scoring database for the defense/special teams athlete position that correlates the simulated performance statistics of the athletes occupying such athlete position with point values used to determine the cumulative athlete scores of the athletes occupying such athlete position.

TABLE 3

Example Scoring Database for Offensive Athlete Positions for a Competition Including Fantasy Sports Teams Associated With the NFL

| Simulated Performance Statistic | Point Value |
|---|---|
| Every 25 passing yards | 1 point |
| Each passing touchdown | 4 points |
| Each interception thrown | −1 point |
| Every 10 rushing yards | 1 point |
| Each rushing touchdown | 6 points |
| Every 10 receiving yards | 1 point |
| Each receiving touchdown | 6 points |
| Each fumble lost | −2 points |
| Each completed pass over 50 yards | 1 point |
| Each reception over 50 yards | 1 point |
| Each touchdown pass longer than 40 yards | 2 points |

TABLE 4

Example Scoring Database for the Kicker Athlete Position for a Competition Including Fantasy Sports Teams Associated With the NFL

| Simulated Performance Statistic | Point Value |
|---|---|
| Each field goal 0 to 19 yards | 3 points |
| Each field goal 20 to 29 yards | 3 points |
| Each field goal 30 to 39 yards | 3 points |
| Each field goal 40 to 49 yards | 4 points |
| Each field goal 50+ yards | 5 points |
| Each extra point | 1 point |

TABLE 5

Example Scoring Database for the Defense/Special Teams Athlete Position for a Competition Including Fantasy Sports Teams Associated With the NFL

| Simulated Performance Statistic | Point Value |
|---|---|
| Each sack | 1 point |
| Each interception | 2 points |
| Each fumble recovery | 2 points |
| Each touchdown | 6 points |
| Each safety | 2 points |
| Each blocked kick | 2 points |
| Each kickoff and punt return touchdown | 6 points |
| Shutout | 10 points |
| 1 to 6 points allowed | 7 points |
| 7 to 13 points allowed | 4 points |
| 14 to 20 points allowed | 1 point |
| 21 to 27 points allowed | 0 points |
| 28 to 34 points allowed | −1 point |
| 35+ points allowed | −4 points |

For example, Athlete 1 occupies the quarterback active athlete position of Team 1. In this example, the gaming system determined Athlete 1's cumulative simulated performance statistics as follows: 300 yards passing, 4 passing touchdowns, 2 thrown interceptions, 10 rushing yards, 0 rushing touchdowns, 0 receiving yards, 0 receiving touchdowns, and 1 fumble lost. In this example, the gaming system uses the scoring database illustrated in Table 1 to determine the Athlete 1's cumulative athlete score based on the cumulative simulated performance statistics as follows: (a) (300 passing yards)*((1 point)/(25 passing yards))=12 points; +(b) (4 passing touchdowns)*(4 points for each passing touchdown)=16 points; +(c) (2 thrown interceptions)*(−1 point for each thrown interception)=−2 points; +(d) (10 rushing yards)* ((1 point)/(10 rushing yards))=1 point; +(e) (0 rushing touchdowns)*(6 points for each rushing touchdown)=0 points; +(f) (0 receiving yards)*((1 point)/(10 receiving yards))=0 points; +(g) (0 receiving touchdowns)*(6 points for each receiving touchdown)=0 points; +(f) (1 fumble lost)*(−2 points for each fumble lost)=−2 points. Thus, Athlete 1's cumulative athlete score in this example is: 12 points+16 points−2 points+1 point+0 points+0 points−2 points=25 points.

In various embodiments in which the gaming system determines individual competition events, for each of the fantasy sports teams in the competition, for each of the athletes of that fantasy sports team occupying one of the active athlete positions of that fantasy sports team, for each determined individual competition event for that athlete, the gaming system determines a score associated with that individual competition event and updates that athlete's cumulative athlete score with that determined score. That is, in these embodiments, an athlete's cumulative athlete score is initially set to zero, and increases or decreases based on each individual event that occurs for that athlete during the competition. In certain embodiments, the cumulative athlete score is displayed to the player as it is updated.

In certain embodiments, a competition is associated with one or more bonus scoring databases in addition to one or more scoring databases. The gaming system uses the bonus scoring databases to determine a bonus point value to add to an athlete's cumulative athlete score and/or a multiplier to apply to the athlete's cumulative athlete score when one or more bonus conditions are satisfied. More specifically, if an athlete in the competition satisfies one or more bonus conditions (e.g., if the simulated performance statistics of that athlete satisfy a bonus condition), the gaming system: (a) adds a quantity of bonus points associated with that bonus condition to the athlete's cumulative athlete score, and/or (b) applies a multiplier associated with that bonus condition to the athlete's cumulative athlete score.

Table 6 below illustrates an example bonus scoring database for a competition including a plurality of fantasy sports teams associated with the NFL. More particularly, Table 6 shows an example bonus scoring database for offensive athlete positions (e.g., quarterback, running back, wide receiver, and tight end) that correlates bonus conditions (which are satisfied based on the simulated performance statistics of the athletes occupying such active athlete positions) with bonus point values or multipliers used to modify the cumulative athlete scores of the athletes occupying such active athlete positions.

TABLE 6

Example Bonus Scoring Database for Offensive Athlete Positions for a Competition Including Fantasy Sports Teams Associated With the NFL

| Bonus Condition | Bonus Point Value or Multiplier |
|---|---|
| Longest completed pass among all athletes in the competition | 10 points |
| Longest pass reception among all athletes in the competition | 10 points |
| Longest rush among all athletes in the competition | 10 points |
| Highest quantity of passing, receiving, or rushing touchdowns | 3X multiplier |
| Highest percentage of completed passes | 1.5X multiplier applied to cumulative athlete score |
| Highest total passing yards | 2X multiplier applied to cumulative athlete score |
| Highest total receiving yards | 2X multiplier applied to cumulative athlete score |

TABLE 6-continued

Example Bonus Scoring Database for Offensive Athlete Positions for a Competition Including Fantasy Sports Teams Associated With the NFL

| Bonus Condition | Bonus Point Value or Multiplier |
|---|---|
| Highest total rushing yards | 2X multiplier applied to cumulative athlete score |

Continuing with the previous example, the gaming system determined that Athlete 1 completed a pass of 85 yards. Athlete 1's 85 yard completion is the longest completed pass among all of the other athletes in the competition. Accordingly, the gaming system adds 10 points to Athlete 1's cumulative athlete score of 25 points, resulting in a cumulative athlete score for Athlete 1 of 35 points.

For each of the fantasy sports teams in the competition, the gaming system determines a total team score associated with that fantasy sports team by summing the cumulative athlete scores of each of the athletes of that fantasy sports team that occupy active athlete positions. For example, the athletes of Team 1 that occupy the active athlete positions of Team 1 have the following cumulative athlete scores: Athlete 1 has a cumulative athlete score of 35 points, Athlete 2 has a cumulative athlete score of 12 points, Athlete 3 has a cumulative athlete score of 14 points, Athlete 4 has a cumulative athlete score of 35 points, Athlete 5 has a cumulative athlete score of 6 points, Athlete 6 has a cumulative athlete score of 18 points, Athlete 7 has a cumulative athlete score of 2 points, Athlete 8 has a cumulative athlete score of 9 points, and Athlete 9 has a cumulative athlete score of 11 points. Accordingly, in this example, Team 1 has a total team score of 142 points.

In various embodiments, during a competition the gaming system enables a player to swap an athlete occupying an active athlete position on the player's fantasy sports team with an athlete occupying an inactive athlete position on the player's fantasy sports team. In these embodiments, the gaming system: (a) does not apply any points earned by the swapped-out athlete to the total team score of the player's fantasy sports team, and (b) applies any points earned by the swapped-in athlete after being swapped into the active athlete position to the total team score of the player's fantasy sports team.

After determining the total team score for each of the fantasy sports teams in the competition, the gaming system ranks each of the fantasy sports teams from highest total team score to lowest total team score. The gaming system provides one or more awards to one or more of the fantasy sports teams. In certain embodiments, one or more of the awards are provided based on the rankings of the fantasy sports teams. In one example, the gaming system only provides one or more awards to the fantasy sports team having the highest total team score. In another example, the gaming system provides an award to a designated quantity of the highest ranking fantasy sports teams in the competition, such as the fantasy sports teams having the three highest total team scores. In other embodiments, one or more of the awards are provided based on the simulated performance of the athletes, the total athlete awards of the athletes, and/or the total team scores of the fantasy sports teams in the competition. For example, the gaming system provides an award to the player whose fantasy sports team includes the athlete having the highest cumulative athlete score. In another example, for each athlete position, the gaming system provides an award to the player whose fantasy sports team includes the athlete occupying that athlete position having the highest cumulative athlete score. In a further example, the gaming system provides an award to each player whose fantasy sports team includes an athlete having a cumulative athlete score greater than a designated cumulative athlete score. In one example, the gaming system provides an award to each player whose fantasy sports team has a total team score greater than a designated total team score. It should thus be appreciated that the gaming system may provide one or more awards to a player whose fantasy sports team did not have the highest total team score.

It should be appreciated that the award may be any suitable award, such that at least one of the awards has monetary value. In certain embodiments, the award is a monetary award, such as an amount of currency (such as $100.00) or a quantity of credits (such as 1,000 credits) having a monetary value. In other embodiments, the award includes is at least one (and possibly more) of the following in addition to a monetary award: (a) a quantity of non-monetary credits (i.e., credits not redeemable for monetary value); (b) a virtual trophy, ribbon, plaque, medal, or other award; (c) a quantity of points or credits associated with a player loyalty program; and (d) an improvement in draft position or order when selecting one or more additional fantasy sports teams (e.g., moving from the fifth player to pick to the third player to pick).

In various embodiments, the gaming system enables a player to enter the player's fantasy sports team into a competition series or a tournament including a plurality of competitions. In one embodiment, the tournament is a single-elimination tournament. In this embodiment, the player's fantasy sports team is entered into a competition against another fantasy sports team. If the player's fantasy sports team wins the competition, the player's fantasy sports team advances in the tournament and competes in another competition against another fantasy sports team. If the player's fantasy sports team loses the competition, the player's fantasy sports team is eliminated from the tournament. In another embodiment, the tournament is a round-robin tournament. In this embodiment, the player's fantasy sports team is entered into a competition against each of the other fantasy sports teams in the tournament. In a further embodiment, the tournament simulates a season of the sports league or leagues with which the player's fantasy sports team is associated. For example, a competition series includes thirty-two fantasy sports teams associated with the NFL. In this example, each of the fantasy sports teams competes in sixteen different competitions, each of which represent a single football game.

In various embodiments, the gaming system does not take athlete injuries into account when determining the cumulative simulated performance of athletes for a competition. In other embodiments, however, the gaming system does take athlete injuries into account when determining the cumulative simulated performance of athletes for a competition. In one such embodiment, the designated historical performance data of an athlete includes data representing that athlete's injury history, such as frequency of injury, severity of injury, and/or time missed due to injury. In this embodiment, the gaming system takes this information into account when determining the cumulative simulated performance of that athlete for a competition. In another such embodiment, the gaming system randomly determines whether an athlete will become injured, the severity of the injury, and the time missed due to the injury, though it should be appreciated that the gaming system may make such a determination in any suitable manner. In certain embodiments, if the gaming system determines that an athlete occupying an active athlete position of a player's fantasy sports team is injured during a competition, the gaming system enables the player to swap the injured athlete with an athlete occupying an inactive athlete position. In one embodiment, any cumulative athlete score earned by the injured athlete prior to being swapped out is applied to the total team score, and any cumulative athlete score earned by the swapped in athlete after being swapped in is applied to the total team score.

In certain embodiments, upon completion of the competition, the gaming system enables the player to save the player's fantasy sports team for use in future competitions. In other embodiments, the gaming system does not enable the player to save the player's fantasy sports team for use in future competitions; rather, the gaming system requires the player to create a new fantasy sports team for each competition. In various embodiments, upon completion of the competition and prior to the initiation of another competition, the gaming system enables the player to modify the player's fantasy sports team, such as by choosing to swap an athlete on the player's fantasy sports team for an athlete from the pool of athletes.

In various embodiments, the gaming system stores a record or list of a player's frequent opponents. In these embodiments, the gaming system offers the player an opportunity to begin a competition immediately or at a designated subsequent time with one or more of the player's frequent opponents. In one embodiment, whenever the player requests a competition, the gaming system enables the player to enter a competition including one or more of the player's frequent opponents or to enter an open competition not including one or more of the player's frequent opponents. In one embodiment, for a player, the gaming system determines a plurality of the player's connections on a social network to be that player's frequent opponents.

In various embodiments, the gaming system employs a combination of cumulative simulated performance and actual performance of athletes to determine a fantasy sports team's total team score. For example, a fantasy sports team in a competition includes a plurality of NFL athletes and a plurality of MLB athletes. At a certain point in time, the NFL season is not occurring, while the MLB season is occurring. In this example, the gaming system determines cumulative simulated performance to determine cumulative athlete scores for the NFL athletes on the player's fantasy sports team, and uses the actual performance of the MLB athletes on the player's fantasy sports team to determine the cumulative athlete scores for those athletes.

In one embodiment, for at least one athlete of a fantasy sports team in a competition, the gaming system determines whether to provide a bonus associated with that athlete when determining that athlete's cumulative simulated performance, wherein the bonus increases that athlete's cumulative simulated performance for the competition. In one example, the gaming system determines whether to apply a "Contract Year" bonus to that athlete and, if the gaming system determines to apply the "Contract Year" bonus, increases that athlete's cumulative simulated performance (such as via a multiplier). It should be appreciated that the gaming system may make such a determination in any of a variety of manners, such as randomly or according to a predetermined probability table. In one embodiment, the gaming system enables the player to determine to which athlete on the player's fantasy sports team to apply such a bonus.

Although the above-described embodiments are directed to fantasy sports teams including human athletes or groups of athletes, it should be appreciated that, in other embodiments, certain or all of the athletes are non-human athletes. In one embodiment, the athletes are real-life horses. In one example, the gaming system enables a player to choose a plurality of real-life horses to include on the player's fantasy sports team. In another embodiment, the athletes are real-life greyhounds.

In another example, the gaming system enables a player to choose a plurality of real-life greyhounds to include on the player's fantasy sports team.

FIG. 3 illustrates a flowchart of an example of a process or method 300 for operating a gaming system of the present disclosure. In one embodiment, process 300 is represented by a set of instructions stored in one or more memories and executed by one or more processors or controllers. Although this process 300 is described with reference to the flowchart shown in FIG. 3, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system enables a player to create a fantasy sports team associated with a real-life sports league, as indicated by block 302. The gaming system enables the player to select one or more real-life athletes who play or have played in that sports league to include on the player's fantasy sports team, as indicated by block 304. Each of the athletes is associated with designated historical performance data. The gaming system enables the player to enter the player's fantasy sports team into a competition in which the player's fantasy sports team competes against one or more other fantasy sports teams that each include one or more of the athletes who play or have played in that sports league, as indicated by block 306. The gaming system determines whether the player has entered the player's fantasy sports team into a competition, as indicated by diamond 308. If the gaming system determines that the player has not entered the player's fantasy sports team into a competition, process 300 returns to block 306.

If the gaming system determines that the player has entered the player's fantasy sports team into a competition, for each of the fantasy sports teams in the competition, for each athlete occupying an active athlete position of that fantasy sports team, the gaming system determines: (a) a cumulative simulated performance of that athlete based at least in part on the designated historical performance data of that athlete, and (b) a cumulative athlete score for that athlete for the competition based on the cumulative simulated performance of that athlete, as indicated by block 310. The gaming system determines, for each of the fantasy sports teams in the competition, a total team score associated with that fantasy sports team by summing the cumulative athlete scores of each athlete occupying an active athlete position of that fantasy sports team, as indicated by block 312. The gaming system provides an award to the fantasy sports team having the highest total team score, as indicated by block 314.

Figure 4A:
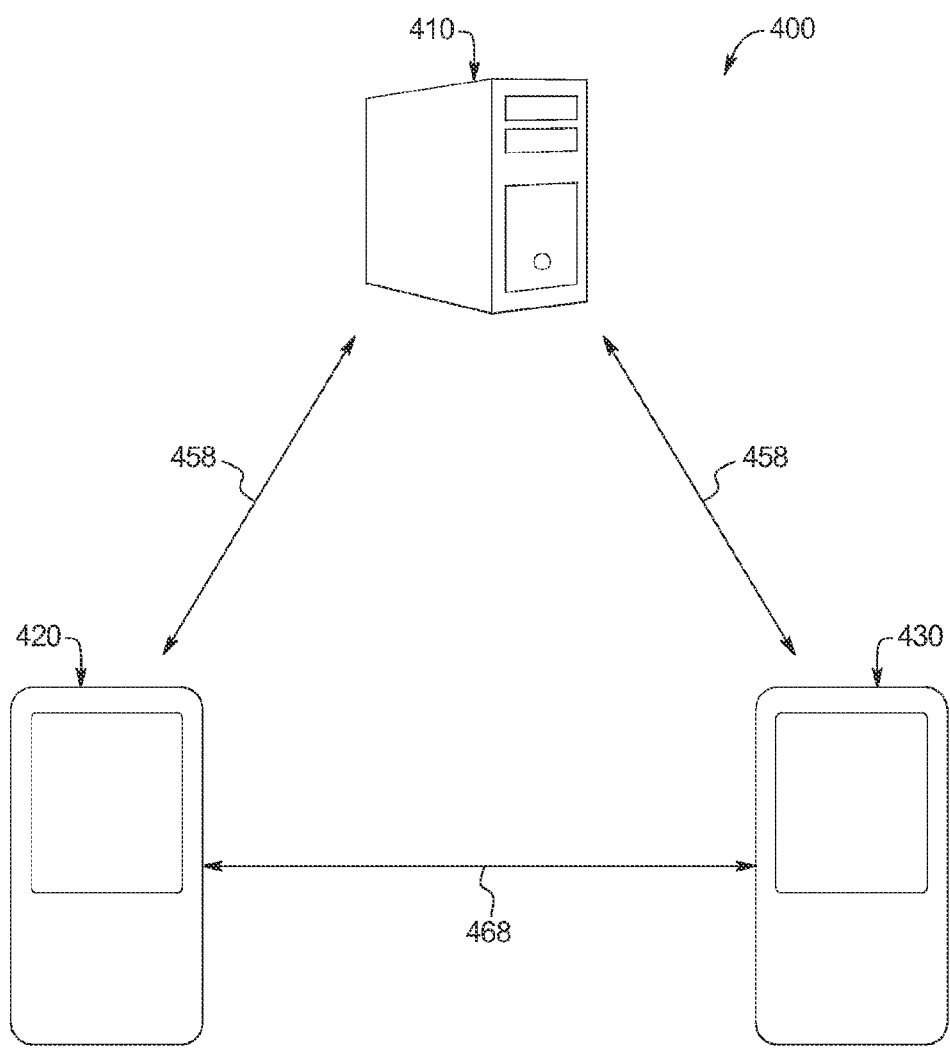
FIG. 4A is a schematic block diagram of another embodiment of a network configuration for two user devices and a central controller, central server, or remote host of another embodiment of the gaming system disclosed herein.

FIG. 4A illustrates one embodiment of the gaming system of the present disclosure including a central server, central controller, or remote host configured to communicate with two user devices, which are configured to communicate with one another. FIGS. 4B, 4C, 4D, 4E, 4F, and 4G illustrate front views of the user devices of the gaming system illustrated in FIG. 4A operating an example of the fantasy sports game of the present disclosure. More specifically, FIG. 4A illustrates a gaming system 400 including a central server, central controller, or remote host 410, a first user device 420, and a second user device 430. Central server, central controller, or remote host 410 is configured to communicate with first user device 420 and second user device 430 via a first data network 458. As shown in FIGS. 4B, 4C, 4D, 4E, 4F, and 4G, first user device 420 includes first display device 422 and second user device 430 includes second display device 432. First user device 420 and second user device 430 are in communication via remote communications link 468. In this example, first data network 458 is an internet, and second data network 468 is a Bluetooth connection.

FIG. 4B illustrates an example of a first player of first user device 420 challenging a second player of second user device 430 to a head to head (i.e., two player) competition in which a first fantasy sports team of the first player competes against a second fantasy sports team of the second player. More specifically, in this example, when first user device 420 and second user device 430 are placed in proximity to one another such that they communicate with one another via remote communications link 468, first user device 420 displays the following message (or any other suitable message) on first display device 422: "DO YOU WANT TO ENTER YOUR FANTASY SPORTS TEAM INTO A COMPETITION AGAINST PLAYER 2'S FANTASY SPORTS TEAM?" First user device displays 420 "YES" and "NO" options on first display device 422 and enables the first player to select one of those options using any suitable input device (described above), such as a touch screen, keypad, or pointing device. In this example, the first player selects "YES."

After the first player indicates the first player's desire to challenge the second player to a competition, the gaming system enables the second player to accept or reject the first player's challenge. In this example, second user device 430 displays the following message (or any other suitable message) on second display device 432: "DO YOU WANT TO ENTER YOUR FANTASY SPORTS TEAM INTO A COMPETITION AGAINST PLAYER 1'S FANTASY SPORTS TEAM? Second user device displays 420 "YES" and "NO" options on second display device 432 and enables the second player to select one of those options using any suitable input device (described above), such as a touch screen, keypad, or pointing device. In this example, the second player selects "YES." It should be appreciated that, in other embodiments, the user devices simultaneously display such messages to the players.

As indicated in FIG. 4C, in this example the gaming system enables one of the players to choose the fee for the competition and the prize won by the winner of the competition. In this example, the gaming system enables the initiator of the competition, which is the first player in this example, to choose the fee and the prize. Accordingly, first user device 420 displays the following message (or any other suitable message) on first display device 422: "PLEASE SELECT ONE OF THE FOLLOWING FEES AND PRIZES FOR THE COMPETITION." In this example, first user device 420 displays the following fees and prizes on first display device 422: (a) Fee: Free, Prize Scheme: Virtual Trophy for Winner; (b) Fee: 100 Virtual Credits, Prize Scheme: 200 Virtual Credits for Winner; (c) Fee: $5 Per Player, Prize Scheme: $8 for Winner. First user device 420 displays the options on first display device 422 and enables the first player to select one of those fees and corresponding prizes using any suitable input device. In this example, the first player selects a fee of 100 Virtual Credits and the corresponding prize of 200 Virtual Credits for the Winner.

It should be appreciated that any suitable fees scheme and any suitable corresponding prize schemes may be employed. It should also be appreciated that the gaming system may determine which player to enable to choose the fee schedule and/or the prize schedule in any suitable manner. It should further be appreciated that in other embodiments the central controller, central server, or remote host chooses the fee schedule and/or the prize schedule in any suitable manner.

After the first player chooses a fee and a prize for the competition, the gaming system enables the second player to confirm or reject the first player's proposed fee and prize. In this example, second user device 430 displays the following message (or any suitable message) on second display device 432: "PLAYER 1 HAS CHOSEN THE FOLLOWING FEE AND PRIZE FOR THE COMPETITION. PLEASE CONFIRM OR REJECT THE PROPOSED FEE AND PRIZE. FEE: 100 VIRTUAL CREDITS. PRIZE: 200 VIRTUAL CREDITS FOR WINNER." Second user device 430 displays "CONFIRM" and "REJECT" options on second display device 432 and enables the second player to select one of those options using any suitable input device. In this example, the second player selects "CONFIRM."

As shown in FIG. 4D, after the second player confirms the first player's selected fee and prize for the competition, both first user device 420 and second user device 430 display the following message (or any other suitable message) on first display device 422 and second display device 432: "100 VIRTUAL CREDITS HAVE BEEN DEDUCTED FROM YOUR ACCOUNT. PLEASE CONFIRM OR MODIFY THE ATHLETES OCCUPYING THE ACTIVE ATHLETE POSITIONS." It should thus be appreciated that, in this example, the first player and the second player had already created their respective fantasy sports teams and selected athletes to include in their respective fantasy sports teams prior to the initiation of the competition. First user device 420 displays on first display device 422 each active athlete position of the first fantasy sports team of the first player and each athlete occupying that athlete position. Similarly, second user device 430 displays on second display device 432 each active athlete position of the second fantasy sports team of the second player and each athlete occupying that athlete position. Both first user device 420 and second user device 430 display "CONFIRM" and "MODIFY" options on first display device 422 and second display device 432, respectively, and enable the first player and the second player to select one of those options using any suitable input device. In this example, both the first player and the second player select "CONFIRM."

After the first player and the second player confirm the athletes occupying the active athlete positions of their respective fantasy sports teams, central server, central controller, or remote host 410 determines, for each of the first fantasy sports team and the second fantasy sports team, for each of the athletes occupying one of the active athlete positions of that fantasy sports team, the cumulative simulated performance of that athlete. In this example, central server, central controller, or remote host 410 determines the cumulative simulated performance of that athlete by: (a) determining zero, one, or a plurality of individual competition events associated with that athlete based at least in part on that athlete's historical data; (b) determining individual competition event simulated performance statistics associated with that individual competition event for that athlete for each of the plurality of statistical categories associated with that active athlete position based at least in part on that athlete's designated historical performance data; and (c) summing the corresponding individual competition event simulated performance statistics, resulting in the cumulative simulated performance statistics for that athlete for each of the plurality of statistical categories associated with that active athlete position.

Figure 4E:
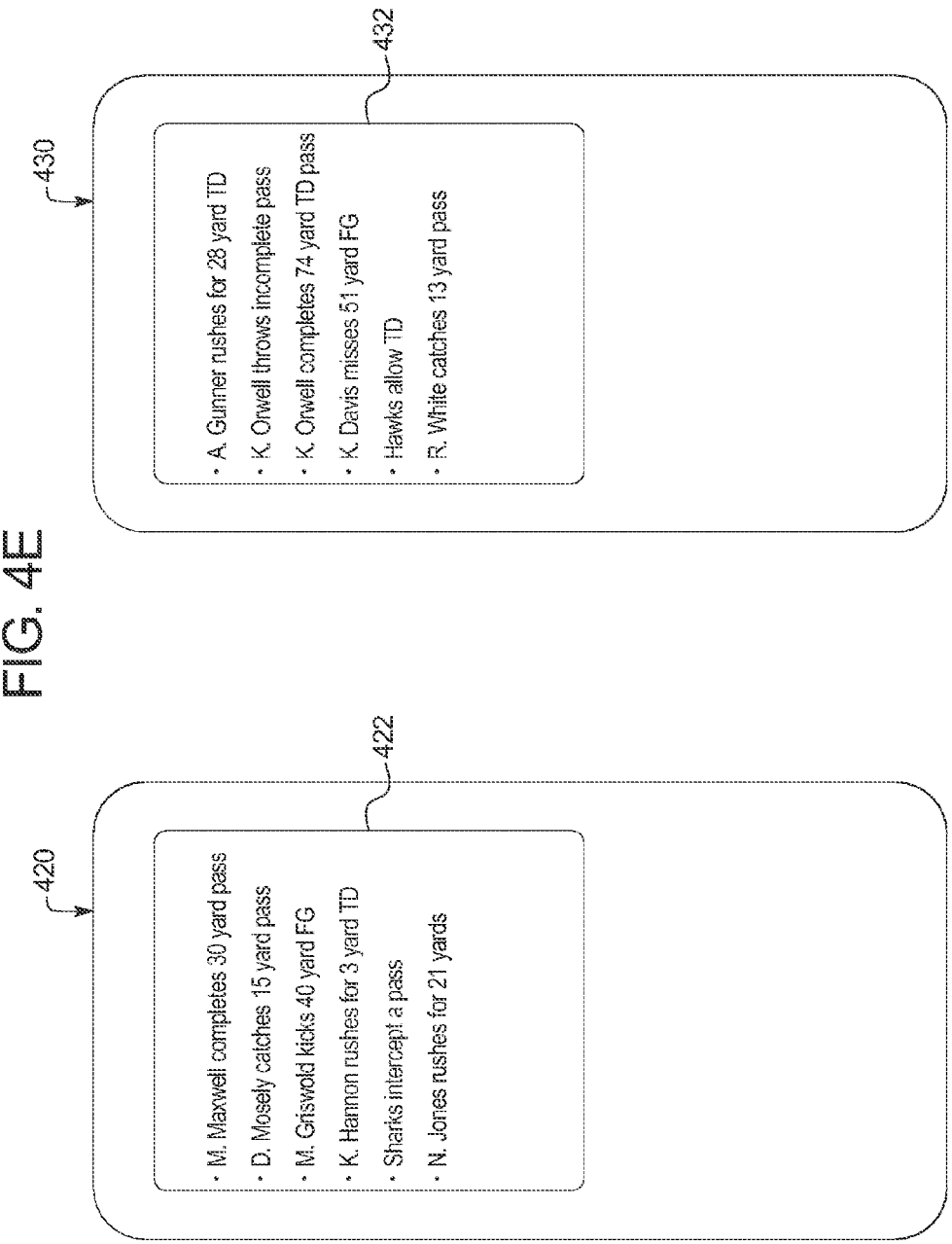

As illustrated in FIG. 4E, first user device 420 displays on first display device 422 a text indication of each of the individual competition events that the central server, central controller, or remote host determines for each of the athletes occupying one of the active athlete positions of the first fantasy sports team. Similarly, second user deice 430 displays on second display device 432 a text indication of each of the individual competition events that the central server, central controller, or remote host determines for each of the athletes occupying one of the active athlete positions of the first fantasy sports team. It should be appreciated that the lists of individual competition events shown in FIG. 4E are a portion of the individual competition events determined by the central server, central controller, or remote host. That is, the display devices of the user device are too small in certain embodiments to fit all of the individual events on the display screens at once.

After determining the cumulative simulated performance as described above, central server, central controller, or remote host 410 determines, for each of the first fantasy sports team and the second fantasy sports team, for each of the athletes occupying one of the active athlete positions of that fantasy sports team, a cumulative athlete score based on the cumulative simulated performance of that athlete. FIG. 4F illustrates these cumulative athlete scores. More specifically, first user device 420 displays on first display device 422 each athlete occupying one of the active athlete positions of the first fantasy sports team and that athlete's cumulative athlete score. Similarly, second user device 430 displays on second display device 432 each athlete occupying one of the active athlete positions of the second fantasy sports team and that athlete's cumulative athlete score.

After determining each of the cumulative athlete scores, central server, central controller, or remote host 410 determines a total team score for each of the first fantasy sports teams and the second fantasy sports teams by summing the cumulative athlete scores for each respective team. As illustrated in FIG. 4G, the first fantasy sports team has a total team score of 123 points, and the second fantasy sports team has a total team score of 124 points. Since the second fantasy sports team has a higher total team score than the first fantasy sports team, the second fantasy sports team wins the prize of 200 Virtual Credits, and the competition ends.

FIG. 5 illustrates a front view of a display device 505 of an example user device of the present disclosure. Display device 505 displays an active athlete position selection screen that enables a player to select which of the athletes on the player's fantasy sports team to assign to the active athlete positions of the player's fantasy sports team. In this example, the player's fantasy sports team is associated with one or more football leagues. In this example, the player's fantasy sports team includes five active athlete positions listed in active athlete position table 550: an active quarterback athlete position configured to be occupied by one athlete having quarterback athlete position eligibility, an active running back athlete position configured to be occupied by two athletes having running back athlete position eligibility, an active wide receiver athlete position configured to be occupied by two athletes having wide receiver athlete position eligibility, an active kicker athlete position configured to be occupied by one athlete having kicker athlete position eligibility, and an active defense athlete position configured to be occupied by one athlete having defense athlete position eligibility. Additionally, in this example, the fantasy sports team includes five inactive athlete positions listed in inactive athlete position table 560: an inactive quarterback athlete position, an inactive running back athlete position, an inactive wide receiver athlete position, an inactive kicker athlete position, and an inactive defense athlete position. An active quarterback athlete position configured to be occupied by one athlete having quarterback athlete position eligibility, an active running back athlete position configured to be occupied by two athletes having running back athlete position eligibility, an active wide receiver athlete position configured to be occupied by two athletes having wide receiver athlete position eligibility, an active kicker athlete position configured to be occupied by one athlete having kicker athlete position eligibility, and an active defense athlete position configured to be occupied by one athlete having defense athlete position eligibility.

In this example, to enter the player's fantasy sports team into a competition, the player must select athletes to occupy each of the active and athlete positions and each of the inactive athlete positions. Quarterback athlete position eligibility table 510 lists the athletes on the player's fantasy sports team having quarterback athlete position eligibility, running back athlete position eligibility table 520 lists the athletes on the player's fantasy sports team having running back athlete position eligibility, kicker athlete position eligibility table 530 lists the athletes on the player's fantasy sports team having kicker athlete position eligibility, and defense athlete eligibility table 540 lists the athletes on the player's fantasy sports team having defense athlete position eligibility. As shown in active athlete position table 550, the player has already selected athletes Kevin Kevinson and Dick Dickson to occupy the active wide receiver athlete position, and athletes Matt Matthews and David Davis to occupy the inactive wide receiver athlete positions. Thus, in this example, for each athlete or pair of athletes listed in athlete position eligibility tables 510, 520, 530, and 540, the player selects that athlete or that pair of athletes and selects an unoccupied active athlete position of active athlete position table 550 or an unoccupied inactive athlete position of inactive athlete position table 560 for that selected athlete or pair of athletes to occupy. It should be appreciated that, for each athlete position, the gaming system only enables player having athlete eligibility for that athlete position to occupy that athlete position.

FIG. 6 illustrates a front view of a display device 605 of an example user device of the present disclosure. More specifically, display device 605 displays a competition screen of a first user device of a first player who has entered the first player's fantasy sports team into a competition against a fantasy sports team of a second player. Display device 605 displays a first player active athlete positions table 610, a first player inactive athlete positions table 620, a second player active athlete positions table 630, and an individual competition events display area 640. In this example, First player active athlete positions table 610 and second player athlete positions table 630 each include: (a) the athletes occupying the active athlete positions of the first player's fantasy sports team and the second player's fantasy sports team, (b) the cumulative athlete score of that athlete at a given point in time during the competition, and (c) the total team score of that fantasy sports team. First player inactive athlete positions table 620 includes the athletes occupying the inactive athlete positions of the first player's fantasy sports team. Individual competition events display area 640 displays text indications of individual competition events determined by the gaming system for each of the athletes occupying the active athlete positions of the first player's fantasy sports team and the second player's fantasy sports team.

FIG. 7 illustrates a flowchart of an example of a process or method 700 for determining individual competition events for one or more athletes occupying one or more active athlete positions of one or more fantasy sports teams in a competition. In one embodiment, process 700 is represented by a set of instructions stored in one or more memories and executed by one or more processors or controllers. Although this process 700 is described with reference to the flowchart shown in FIG. 7, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system determines, for each of a first user-created fantasy sports team 715, a second user-created fantasy sports team 725, and a third user-created fantasy sports team 735 in a competition, one or more individual events for one or more athletes occupying the active athlete positions of that fantasy sports team, as indicated by block 710. In this embodiment, the gaming system determines the individual events using a database 705 storing the athletes' associated designated historical performance data. The gaming system determines a total team score for each of the fantasy sports teams based on the determined individual events, as indicated by block 720. In this embodiment, the gaming system determines the total team scores using a scoring algorithm 745 that associates the individual events with scores. The gaming system determines a winner of the competition based on the total team scores of the fantasy sports teams, as indicated by block 730. The gaming system determines and provides an award to the winner of the competition, as indicated by block 740. In this embodiment, the gaming system determines the award using an award database 755 storing data representing a plurality of potential awards.

FIG. 8 illustrates a flowchart of an example of a process or method 800 for enabling a player to create a fantasy sports team and select athletes to include on the player's fantasy sports team. In one embodiment, process 800 is represented by a set of instructions stored in one or more memories and executed by one or more processors or controllers. Although this process 800 is described with reference to the flowchart shown in FIG. 8, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system enables a player to create a fantasy sports team or modify a previously created fantasy sports team, as indicated by block 810. The gaming system displays a pool of athletes from which the player may select one or more athletes to include on the player's fantasy sports team, as indicated by block 820. In this embodiment, the gaming system includes a database 805 storing data representing the athletes in the pool of athletes and the athletes' associated designated historical performance data. The gaming system enables the player to select one or more of the athletes from the pool of athletes to include on the player's fantasy sports team, as indicated by block 830. When the player has finished selecting athletes, the gaming system stores data representing the player's created fantasy sports team in a database, such as database 815, that includes data representing any fantasy sports teams previously created and saved by the player, as indicated by block 840. The gaming system enables the player to enter the player's created fantasy sports team into a competition, as indicated by block 850.

FIG. 9 illustrates a flowchart of an example of a process or method 900 for operating a competition that begins at a first predetermined time and ends at a second subsequent predetermined time. In one embodiment, process 900 is represented by a set of instructions stored in one or more memories and executed by one or more processors or controllers. Although this process 900 is described with reference to the flowchart shown in FIG. 9, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system establishes a start time and an end time for a competition, as indicated by block 902. The gaming system enables one or more players to enter their respective fantasy sports teams in the competition, as indicated by block 904. Upon the arrival of the start time, the gaming system closes the competition to new entrants and begins the competition, as indicated by block 906. The gaming system determines an individual event for one of the athletes occupying the active athlete positions of the fantasy sports teams in the competition, as indicated by block 908. In this embodiment, the gaming system determines the individual event using a database 905 storing data representing the athletes and the athletes' associated designated historical performance data. The gaming system displays an indication representing the determined individual event, as indicated by block 910. The gaming system updates a total athlete score of the athlete for whom the individual event was determined, as indicated by block 912. The gaming system determines whether the end time has arrived, as indicated by diamond 914. If the gaming system determines that the end time has not arrived, process 900 returns to block 908. If the gaming system determines that the end time has arrived, the gaming system determines the winner or winners of the competition and provides any awards, as indicated by block 916. The gaming system ends the competition, as indicated by block 918.

FIG. 10 illustrates a flowchart of an example of a process or method 1000 for enabling a player to create an on-demand competition and invite opponents to join the player in the on-demand competition, and for operating the on-demand competition. In one embodiment, process 1000 is represented by a set of instructions stored in one or more memories and executed by one or more processors or controllers. Although this process 1000 is described with reference to the flowchart shown in FIG. 10, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system enables a player to begin a competition, as indicated by block 1002. The gaming system enables the player to invite one or more opponents to play in the competition, and determines whether the player invites an opponent to play in the competition, as indicated by diamond 1004. If the gaming system determines that the player has not invited an opponent to play in the competition, the gaming system enables one or more players to enter the competition, as indicated by block 1006, and proceeds to diamond 1010 (described below). If the gaming system determines that the player has invited an opponent to play in the competition, the gaming system determines whether the invited opponent accepted the invitation, as indicated by diamond 1008. If the gaming system determines that the invited opponent did not accept the invitation, process 1000 returns to diamond 1004.

If the gaming system determines that the invited opponent accepted the invitation, the gaming system determines whether a sufficient number of players have entered the competition, as indicated by diamond 1010. If the gaming system determines that a sufficient number of players have not entered the competition, process 1000 returns to diamond 1004. If the gaming system determines that a sufficient number of players have entered the competition, the gaming system closes the competition to new entrants and begins the competition, as indicated by block 1012. The gaming system determines an individual event for one of the athletes occupying the active athlete positions of the fantasy sports teams in the competition, as indicated by block 1014. In this embodiment, the gaming system determines the individual event using a database 1005 storing data representing the athletes and the athletes' associated designated historical performance data. The gaming system displays an indication representing the determined individual event, as indicated by block 1016. The gaming system updates a total athlete score of the athlete for whom the individual event was determined, as indicated by block 1018. The gaming system determines whether an end time has arrived, as indicated by diamond 1020. If the gaming system determines that the end time has not arrived, process 1000 returns to block 1014. If the gaming system determines that the end time has arrived, the gaming system determines the winner or winners of the competition and provides any awards, as indicated by block 1022. The gaming system ends the competition, as indicated by block 1024.

FIG. 11 illustrates a flowchart of an example of a process or method 1100 for enabling a player to create a fantasy sports team and select athletes to occupy the active and inactive athlete positions on the player's fantasy sports team. In one embodiment, process 1100 is represented by a set of instructions stored in one or more memories and executed by one or more processors or controllers. Although this process 1100 is described with reference to the flowchart shown in FIG. 11, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system enables a player to create a fantasy sports team or modify a previously created fantasy sports team, as indicated by block 1110. The gaming system displays a pool of athletes from which the player may select one or more athletes to include on the player's fantasy sports team, as indicated by block 1120. In this embodiment, the gaming system includes a database 1105 storing data representing the athletes in the pool of athletes and the athletes' associated designated historical performance data. The gaming system enables the player to select one or more of the athletes from the pool of athletes to occupy the active athlete positions of the player's fantasy sports team, as indicated by block 1130. The gaming system enables the player to select one or more of the athletes from the pool of athletes to occupy the inactive athlete positions of the player's fantasy sports team, as indicated by block 1140. When the player has finished selecting athletes, the gaming system stores data representing the player's created fantasy sports team in a database, such as database 1115, that includes data representing any fantasy sports teams previously created and saved by the player, as indicated by block 1150. The gaming system enables the player to enter the player's created fantasy sports team into a competition, as indicated by block 1160.

FIG. 12 illustrates a flowchart of an example of a process or method 1200 for enabling a player to create an on-demand competition and invite opponents to join the player in the on-demand competition, for operating the on-demand competition, and for enabling a player to swap an athlete occupying an active athlete position of that player's fantasy sports team with an athlete occupying an inactive athlete position of that player's fantasy sports team. In one embodiment, process 1200 is represented by a set of instructions stored in one or more memories and executed by one or more processors or controllers. Although this process 1200 is described with reference to the flowchart shown in FIG. 12, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system enables a player to begin a competition, as indicated by block 1202. The gaming system enables the player to invite one or more opponents to play in the competition, and determines whether the player invites an opponent to play in the competition, as indicated by diamond 1204. If the gaming system determines that the player has not invited an opponent to play in the competition, the gaming system enables one or more players to enter the competition, as indicated by block 1206, and proceeds to diamond 1210 (described below). If the gaming system determines that the player has invited an opponent to play in the competition, the gaming system determines whether the invited opponent accepted the invitation, as indicated by diamond 1208. If the gaming system determines that the invited opponent did not accept the invitation, process 1200 returns to diamond 1204

If the gaming system determines that the invited opponent accepted the invitation, the gaming system determines whether a sufficient number of players have entered the competition, as indicated by diamond 1210. If the gaming system determines that a sufficient number of players have not entered the competition, process 1200 returns to diamond 1204. If the gaming system determines that a sufficient number of players have entered the competition, the gaming system closes the competition to new entrants and begins the competition, as indicated by block 1212. The gaming system determines an individual event for one of the athletes occupying the active athlete positions of the fantasy sports teams in the competition, as indicated by block 1214. In this embodiment, the gaming system determines the individual event using a database 1216 storing data representing the athletes and the athletes' associated designated historical performance data. The gaming system displays an indication representing the determined individual event, as indicated by block 1216. The gaming system updates a total athlete score of the athlete for whom the individual event was determined, as indicated by block 1218. The gaming system determines whether an end time has arrived, as indicated by diamond 1220. If the gaming system determines that the end time has arrived, the gaming system determines the winner or winners of the competition and provides any awards, as indicated by block 1022. The gaming system ends the competition, as indicated by block 1024.

If the gaming system determines that the end time has not arrived, the gaming system determines whether one of the players has chosen to swap an athlete occupying an active athlete position with an athlete occupying an inactive athlete position, as indicated by diamond 1226. If the gaming system determines that none of the players have chosen to swap an athlete occupying an active athlete position with an athlete occupying an inactive athlete position, process 1200 returns to block 1214. If the gaming system determines that one of the players has chosen to swap an athlete occupying an active athlete position with an athlete occupying an inactive athlete position, the gaming system enables that player to select which athletes in which of the active and inactive athlete positions of that player's fantasy sports team to swap, and swaps the selected athletes, as indicated by block 1228. Process 1200 returns to block 1214.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, said method comprising:
   (a) causing at least one processor to execute a plurality of instructions stored in at least one memory device to receive a competition initiation request from at least one of a plurality of players, each of the plurality of players being associated with a separate fantasy sports team, each of the fantasy sports teams including a plurality of athletes;
   (b) in response receiving the competition request, causing the at least one processor to execute the plurality of instructions to initiate a competition including the fantasy sports teams of the plurality of players and operate with at least one display device to display the competition;
   (c) for each of the fantasy sports teams, causing the at least one processor to execute the plurality of instructions to:
      (i) for each of one or more of the athletes on said fantasy sports team:
         (A) determine a cumulative simulated performance of said athlete based on designated historical performance data of said athlete, and
         (B) determine a cumulative athlete score of said athlete based on the determined cumulative simulated performance of said athlete; and
      (ii) determine a total team score for said fantasy sports team based on the determined cumulative athlete scores of said one or more athletes on said fantasy sports team;
   (d) causing the at least one processor to execute the plurality of instructions to determine which of the fantasy sports teams has the highest total team score; and
   (e) causing the at least one processor to execute the plurality of instructions to operate with the at least one display device to display one or more awards to be provided to the fantasy sports team having the highest total team score, at least one of the awards being a monetary award.

2. The method of claim 1, which includes, for each of the fantasy sports teams, causing the at least one processor to execute the plurality of instructions to, for each of the one or more of the athletes on said fantasy sports team, determine the cumulative simulated performance of said athlete: (a) independent of a cumulative simulated performance of any of the other athletes on said fantasy sports team, (b) based at least in part on a cumulative simulated performance of one or more of the other athletes on said fantasy sports team, or (c) based at least in part on the cumulative simulated performance of one or more of the athletes on one or more of the other fantasy sports teams.

3. The method of claim 1, which includes causing the at least one processor to execute the plurality of instructions to receive a fee from each of the players prior to initiating the competition.

4. The method of claim 1, which includes causing the at least one processor to execute the plurality of instructions to, for each of the fantasy sports teams, for each of the one or more of the athletes on said fantasy sports team, determine the cumulative simulated performance of said athlete based on the designated historical performance data of said athlete by determining at least one individual competition event for said athlete for said competition.

5. The method of claim 4, which includes causing the at least one processor to execute the plurality of instructions to operate with the at least one display device to display an indication of the at least one individual competition event.

6. The method of claim 5, which includes causing the at least one processor to execute the plurality of instructions to, for each of the fantasy sports teams, for each of the one or more of the athletes on said fantasy sports team, determine the cumulative athlete score of said athlete based at least in part of the at least one individual competition event.

7. The method of claim 1, which is provided through a data network.

8. The method of claim 7, wherein the data network is an internet.

9. A gaming system comprising:
   at least one processor; and
   at least one memory device storing a plurality of instructions which, when executed by the at least one processor, cause the at least one processor to:
   (a) receive a competition initiation request from at least one of a plurality of players, each of the plurality of players being associated with a separate fantasy sports team, each of the fantasy sports teams including a plurality of athletes;
   (b) in response receiving the competition request, initiate a competition including the fantasy sports teams of the plurality of players and cause at least one display device to display the competition;
   (c) for each of the fantasy sports teams:
      (i) for each of one or more of the athletes on said fantasy sports team:
         (A) determine a cumulative simulated performance of said athlete based on designated historical performance data of said athlete, and
         (B) determine a cumulative athlete score of said athlete based on the determined cumulative simulated performance of said athlete; and
      (ii) determine a total team score for said fantasy sports team based on the determined cumulative athlete scores of said one or more athletes on said fantasy sports team;
   (d) determine which of the fantasy sports teams has the highest total team score; and
   (e) cause the at least one display device to display one or more awards to be provided to the fantasy sports team having the highest total team score, wherein at least one of the awards is a monetary award.

10. The gaming system of claim 9, wherein the plurality of instructions, when executed by the at least one processor, cause the at least one processor to, for each of the fantasy sports teams, for each of the one or more of the athletes on said fantasy sports team, determine the cumulative simulated performance of said athlete: (a) independent of a cumulative simulated performance of any of the other athletes on said fantasy sports team, (b) based at least in part on a cumulative simulated performance of one or more of the other athletes on said fantasy sports team, or (c) based at least in part on the cumulative simulated performance of one or more of the athletes on one or more of the other fantasy sports teams.

11. The gaming system of claim 9, wherein the plurality of instructions, when executed by the at least one processor, cause the at least one processor to receive a fee from each of the players prior to initiating the competition.

12. The gaming system of claim 9, wherein the plurality of instructions, when executed by the at least one processor, cause the at least one processor to, for each of the fantasy sports teams, for each of the one or more of the athletes on said fantasy sports team, determine the cumulative simulated performance of said athlete based on the designated historical performance data of said athlete by determining at least one individual competition event for said athlete for said competition.

13. The gaming system of claim 12, wherein the plurality of instructions, when executed by the at least one processor, cause the at least one processor to cause the at least one display device to display an indication of the at least one individual competition event.

14. The gaming system of claim 13, wherein the plurality of instructions, when executed by the at least one processor, cause the at least one processor to, for each of the fantasy sports teams, for each of the one or more of the athletes on said fantasy sports team, determine the cumulative athlete score of said athlete based at least in part of the at least one individual competition event.

15. A non-transitory computer readable medium storing a plurality of instructions which, when executed by at least one processor, cause the at least one processor to perform a method comprising:
 (a) receiving a competition initiation request from at least one of a plurality of players, each of the plurality of players being associated with a separate fantasy sports team, each of the fantasy sports teams including a plurality of athletes;
 (b) in response receiving the competition request, initiating a competition including the fantasy sports teams of the plurality of players and causing at least one display device to display the competition;
 (c) for each of the fantasy sports teams:
  (i) for each of one or more of the athletes on said fantasy sports team:
   (A) determining a cumulative simulated performance of said athlete based on designated historical performance data of said athlete, and
   (B) determining a cumulative athlete score of said athlete based on the determined cumulative simulated performance of said athlete; and
  (ii) determining a total team score for said fantasy sports team based on the determined cumulative athlete scores of said one or more athletes on said fantasy sports team;
 (d) determining which of the fantasy sports teams has the highest total team score; and
 (e) causing the at least one display device to display one or more awards to be provided to the fantasy sports team having the highest total team score, wherein at least one of the awards is a monetary award.

16. The non-transitory computer readable medium of claim 15, wherein the method includes, for each of the fantasy sports teams, for each of the one or more of the athletes on said fantasy sports team, determining the cumulative simulated performance of said athlete: (a) independent of a cumulative simulated performance of any of the other athletes on said fantasy sports team, (b) based at least in part on a cumulative simulated performance of one or more of the other athletes on said fantasy sports team, or (c) based at least in part on the cumulative simulated performance of one or more of the athletes on one or more of the other fantasy sports teams.

17. The non-transitory computer readable medium of claim 15, wherein the method includes receiving a fee from each of the players prior to initiating the competition.

18. The non-transitory computer readable medium of claim 15, wherein the method includes, for each of the fantasy sports teams, for each of the one or more of the athletes on said fantasy sports team, determining the cumulative simulated performance of said athlete based on the designated historical performance data of said athlete by determining at least one individual competition event for said athlete for said competition.

19. The non-transitory computer readable medium of claim 18, wherein the method includes causing the at least one display device to display an indication of the at least one individual competition event.

20. The non-transitory computer readable medium of claim 19, wherein the method includes, for each of the fantasy sports teams, for each of the one or more of the athletes on said fantasy sports team, determining the cumulative athlete score of said athlete based at least in part of the at least one individual competition event.

\* \* \* \* \*